United States Patent
Chen et al.

(10) Patent No.: US 8,973,013 B2
(45) Date of Patent: *Mar. 3, 2015

(54) COMPOSING ANALYTIC SOLUTIONS

(75) Inventors: Ying Chen, San Jose, CA (US); Thilina Gunarathne, Bloomington, IN (US); Eugene M. Maximilien, San Jose, CA (US); William S. Spangler, San Martin, CA (US)

(73) Assignee: International Business Machines Corporation, Armonk, NY (US)

( * ) Notice: Subject to any disclaimer, the term of this patent is extended or adjusted under 35 U.S.C. 154(b) by 164 days.

This patent is subject to a terminal disclaimer.

(21) Appl. No.: 13/596,135

(22) Filed: Aug. 28, 2012

(65) Prior Publication Data
US 2013/0104134 A1 Apr. 25, 2013

Related U.S. Application Data

(63) Continuation of application No. 13/280,386, filed on Oct. 25, 2011.

(51) Int. Cl.
| | |
|---|---|
| *G06F 9/44* | (2006.01) |
| *G06F 9/46* | (2006.01) |
| *G06N 5/00* | (2006.01) |
| *G06F 9/50* | (2006.01) |
| *G06F 17/30* | (2006.01) |

(52) U.S. Cl.
CPC .......... *G06F 9/5038* (2013.01); *G06F 17/3089* (2013.01); *G06F 8/34* (2013.01); *G06N 5/00* (2013.01)
USPC ............. 718/106; 706/45; 717/109; 717/113; 705/7.26

(58) Field of Classification Search
None
See application file for complete search history.

(56) References Cited

U.S. PATENT DOCUMENTS

| | | | |
|---|---|---|---|
| 7,665,064 B2 | 2/2010 | Able et al. | |
| 7,739,292 B2 | 6/2010 | Falk et al. | |
| 7,788,631 B2 | 8/2010 | Sieron et al. | |
| 7,877,725 B2 | 1/2011 | Vitanov et al. | |
| 7,926,063 B2 | 4/2011 | Afshar et al. | |
| 7,933,891 B2 | 4/2011 | Larkin et al. | |
| 2003/0176929 A1* | 9/2003 | Gardner | 700/17 |

(Continued)

OTHER PUBLICATIONS

Automatic Composition and Selection of Semantic Web Services Tor Arne Kvaløy, Erik Rongen, Alfredo Tirado-Ramo2, and Peter Sloot Published: 2005.*

(Continued)

*Primary Examiner* — Emerson Puente
*Assistant Examiner* — Paul Mills
(74) *Attorney, Agent, or Firm* — Schmeiser, Olsen & Watts

(57) ABSTRACT

An approach for composing an analytic solution is provided. After associating descriptive schemas with web services and web-based applets, a set of input data sources is enumerated for selection. A desired output type is received. Based on the descriptive schemas that specify required inputs and outputs of the web services and web-based applets, combinations of web services and web-based applets are generated. The generated combinations achieve a result of the desired output type from one of the enumerated input data sources. Each combination is derived from available web services and web-based applets. The combinations include one or more workflows that provide an analytic solution. A workflow whose result satisfies the business objective may be saved. Steps in a workflow may be iteratively refined to generate a workflow whose result satisfies the business objective.

10 Claims, 11 Drawing Sheets

(56) References Cited

U.S. PATENT DOCUMENTS

| | | | |
|---|---|---|---|
| 2005/0038776 A1* | 2/2005 | Cyrus et al. | 707/3 |
| 2007/0094211 A1* | 4/2007 | Sun et al. | 706/50 |
| 2007/0240050 A1* | 10/2007 | Quinn-Jacobs | 715/700 |
| 2008/0250390 A1* | 10/2008 | Feblowitz et al. | 717/114 |
| 2010/0070553 A1 | 3/2010 | Addala et al. | |
| 2010/0145902 A1 | 6/2010 | Boyan et al. | |

OTHER PUBLICATIONS

Ontology-Driven KDD Process Composition Claudia Diamantini, Domenico Potena, and Emanuele Storti Published: 2009.*

InfVis—Platform-Independent Visual Data Mining of Multidimensional Chemical Data Sets Frank Oellien, Wolf-Dietrich Ihlenfeldt, and Johann Gasteiger Published: 2005.*

Expressive Reusable Workflow Templates Yolanda Gil, Paul Groth, Varun Ratnakar, Christian Fritz Published: 2009.*

On the complexity of a class of combinatorial optimization problems with uncertainty Igor Averbakh Published: 2001.*

Improving the Reuse of ScientificWorkflows and Their By-products Xiaorong Xiang, Gregory Madey Published: 2007.*

Dynamic Composition of Semantically Annotated Web Services through QoS-aware HTN Planning Algorithms Anna Hristoskova, Bruno Volckaert, Filip De Turck Published: 2009.*

Configuration of Web Services as Parametric Design Annette ten Teije, Frank van Harmelen, and Bob Wielinga Published: 2004.*

Abductive Planning Approach for Automated Web Service Composition Using Only User Specified Inputs and Outputs ESAT KAAN KUBAN p. iv, 38-47, and 56-58 Published: 2009.*

Hasan et al., COA: Finding Novel Patents through Text Analysis, KDD '09, Jun. 28-Jul. 1, 2009, Paris, France, copyright 2009 ACM 978-1-60558-495-9/09/06, 9 pages.

Chen et al., SIMPLE: A Strategic Information Mining Platform for Licensing and Execution, 2009 IEEE International Conference on Data Mining Workshops, 978-0/7695-3902-7-2009, pp. 270-275.

Shahzad Tiwana et al., Extracting Problem Solved Concepts from Patent Documents, PaIR'09, Nov. 6, 2009, Hong Kong China, copyright 2009, ACM 978-1-60558-809-4/09/11, pp. 43-48.

U.S. Appl. No. 13/280,386, filed Oct. 25, 2011.

* cited by examiner

COMPOSING ANALYTIC SOLUTIONS

This application is a continuation application claiming priority to U.S. Ser. No. 13/280,386, filed Oct. 25, 2011.

TECHNICAL FIELD

The present invention relates to a data processing method and system for generating an analytic process to achieve an analytic goal, and more particularly to a technique for generating an analytic process by combining analytic tools and visualization techniques.

BACKGROUND

Exploratory analytics or exploratory data analysis is a data analysis approach in which hypotheses worth testing are formulated, and which complements the tools of conventional statistics for testing hypotheses. Statistician John Tukey named exploratory data analysis to contrast with Confirmatory Data Analysis, which is the term used for the set of ideas about hypothesis testing, p-values, confidence intervals, and so on. In a sense, exploratory analytics is the process of learning what you need to ask. Exploratory analytics is especially relevant today with the explosion of diverse types of information both within organizations and in the public domain. While standard search and text mining algorithms have proven invaluable in accessing such data, difficulties still arise when users have insufficient knowledge of the data to know what to search for. In this regard, "search" is like "confirmatory data analysis" which requires a hypothesis (i.e., a search term) in order to begin. In many cases it is wise not to form such a hypothesis immediately, but to let the data guide the formulation of a hypothesis through analytics. In particular, Intellectual Properties (IP) is an excellent domain to prove the value of exploratory data analysis. First of all, IP is one of the most valuable information assets to corporations. Appropriate management and leverage of IP information can create significant competitive advantages, generate high-value and low-cost returns through licensing and divesting opportunities, and enable major science and technology breakthroughs. IP activities may range from prior art search, portfolio analysis and management, licensing target identification, divestiture analysis, to patent valuation. As the patent portfolio grows, knowledge discovery in patent data becomes more valuable, as it can save significant money for enterprises in their patent management cost.

BRIEF SUMMARY

First embodiments of the present invention provide a method of generating an analytic process. The method comprises the steps of:

associating, with each of a plurality web services and web-based applets, a respective schema, the respective schemas describing inputs and outputs of the web services and the web-based applets;

enumerating a set of input data sources for selection;

receiving a desired output type from a user; and based on the respective schemas, generating combinations of the web services and the web-based applets that achieve the desired output type from each of the input data sources, wherein each combination is derived from available web services and available web-based applets, and wherein the generated combinations indicate suggested workflows that provide analytic solutions.

The aforementioned steps of associating, enumerating, receiving and generating are performed by at least one computer.

Second embodiments of the present invention provide a method of generating an analytic solution. The method comprises the steps of:

associating, with each of a plurality of web services and web-based applets, a respective schema, the respective schemas describing inputs and outputs of the web services and the web-based applets;

receiving an input data source from a user;

receiving a desired output type from a user; and based on the respective schemas, the received input data source, and the received desired output type, generating combinations of the web services and the web-based applets that achieve the desired output type from the received input data source, wherein each combination is derived from available web services and available web-based applets, and wherein the generated combinations indicate suggested workflows that provide analytic solutions.

The aforementioned steps of associating, receiving the input data source, receiving the desired output type, and generating are performed by at least one computer.

Systems, program products and processes for supporting computing infrastructure where each process provides at least one support service are also described herein, where the systems, program products and processes for supporting computing infrastructure correspond to the aforementioned methods.

Embodiments of the present invention provide a technique for using exploratory analytics to generate analytic processes for knowledge discovery over a large corpus of unstructured technical content. Embodiments of the present invention may generate the necessary machinery to implement a workflow using a workflow engine and generate a user interface for interactive parts of a system.

DETAILED DESCRIPTION

Overview

Figure 1:
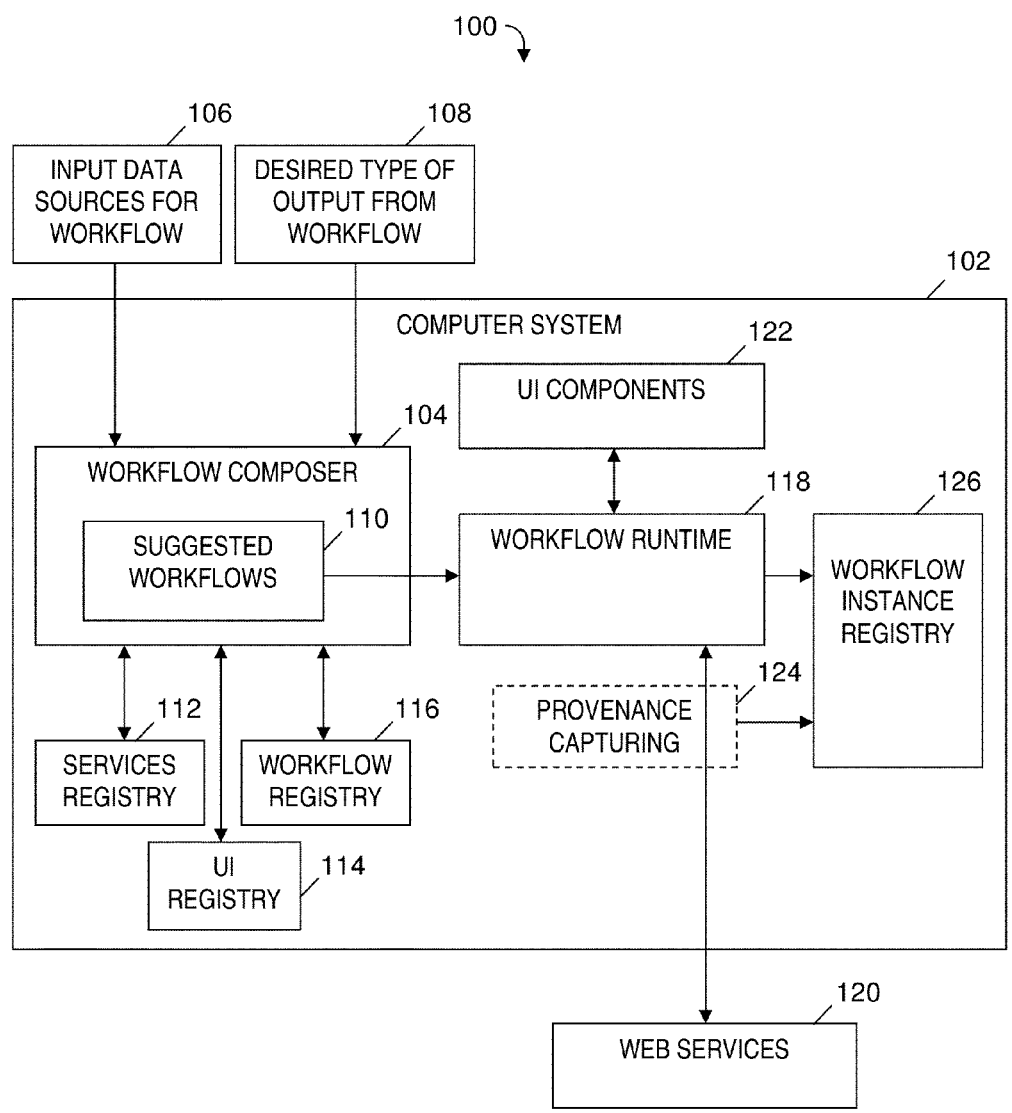
FIG. 1 is a block diagram of a system for generating an analytic solution, in accordance with embodiments of the present invention.

The present invention recognizes that known IP activities rely on tedious, expensive and error-prone manual processing. Further, the large variation in the quantity, quality, and unique characteristics of IP information make it especially challenging to adopt existing text and data mining solutions.

The present invention recognizes that analyzing patents is particularly challenging for current forms of text and data mining techniques. First, raw patent data provided by different authorities is widely available in different formats (e.g., XML and images). Such raw patent data, however, is complex. Patents contain a large set of highly valuable structured fields such as inventors, assignees, dates, and class codes. In addition, there are multiple unstructured text fields such as title, abstract, claims, and text body of the patents. While the abstract and claims sections are usually relatively short, the rest of the patent may be very long and can contain text on subject matter that is related but not entirely germane to the invention.

Because of the size of the overall patent corpus and because the language of patents is verbose, legalistic and often highly technical, simple keyword retrieval falls short for most important analytics tasks and it is usually difficult or impossible for a non-expert analyst to design a query that is likely to succeed in returning the handful of patents that are actually relevant without also returning a large number of irrelevant ones. A way to summarize and quickly wade through such return data is needed in order to focus on just the content of most interest. Simply sorting the return data set using ranking algorithms such as PageRank® performs poorly on this data set because the available links between patents are not created in a suitable fashion to capture the "wisdom of crowds".

Embodiments of the present invention provide a method based on exploratory data analysis that may be practiced, not only by a small set of expert practitioners, but also by a wider business audience. Embodiments of the present invention provide a novel solution to the problem of creating methods to do exploration and discovery over a large corpus of unstructured technical content using exploratory analytics. In one embodiment, an environment is created for the generation of "analytic recipes" which enable users to create and reuse analytic processes.

Embodiments of the present invention may provide a method and associated tooling that provide a means for easily integrating various analytics tools (e.g., exploratory analytics and data visualization), analytics services, and various data sources inside and outside an enterprise to allow any business person to dynamically generate analytics processes that help reveal insights from a large collection of data. In one embodiment, a novel means of combining analytic tools and visualization techniques into a functioning analytic process to achieve a specific analytic goal is provided. The Example Exploratory Analytic Operations section presented below includes examples (i.e., not a comprehensive list) of specific analytic functions that embodiments of the present invention can combine to create analytic processes.

System for Composing an Analytic Solution

FIG. 1 is a block diagram of a system for generating an analytic solution, in accordance with embodiments of the present invention. System 100 may include a computer system 102, which runs a software-based workflow composer 104 for generating (a.k.a. composing) workflows that provide analytic processes. Workflow composer 104 receives identifiers of input data sources 106 and a desired type of output 108 (e.g., trend chart or contingency table). Using back chaining reasoning based on the received input data sources and the desired type of output, workflow composer 104 generates suggested workflows 110 that may include services retrieved from services registry 112 and user interface (UI) components retrieved from UI registry 114. Workflow composer 104 may also compose a workflow by including or editing a previously generated workflow retrieved from workflow registry 116.

Workflow composer 104 sends suggested workflows 110 to a software-based workflow runtime 118. Workflow runtime 118 receives suggested workflows 110 and runs each of the received suggested workflows 110. To run a suggested workflow, workflow runtime 118 runs one or more web services 120 included in the suggested workflow by workflow composer 110. Web services 120 are the analytic components that process data (e.g., transform data, run an analytic process, run a statistical analysis, generate a graph, etc.). Each web service is a monotonic entity to which input is given and from which output is generated. A sequence of web services selected from web services 120 may provide the steps of an analytic process. In one embodiment, workflow runtime 118 may run a workflow that is a combination of one or more web services retrieved from web services 120 and one or more web-based applets (not shown), so that the web service(s) and the web-based applet(s) in the combination are run in a particular order from a first item (i.e., web service or web-based applet) in the ordered combination to an N-th item (i.e., web service or web-based applet) in the ordered combination. Furthermore, the output of an i-th item (i.e., web service or web-based applet) of the ordered combination having N items is the input to an (i+1)-th item (i.e., web service or web-based applet) of the ordered combination, where N and i are integers and $1 \leq i < N$. As used herein, a web-based applet is defined as program code that is downloaded from a server and run in a web browser to perform a specific task. As used herein, a web-based applet may be a Java® applet or a nonJava® web-based applet.

Workflow runtime 118 retrieves one or more UI components from UI components 122, where the UI component(s) allow a user to interact with the suggested workflow as the workflow is being run by workflow runtime 118. For example, a UI component may allow a user to edit the workflow, verify that the result of running the workflow is correct, and to enter input to direct the analysis provided by running the workflow.

A software-based provenance capturing tool 124 saves a history of the results of running the suggested workflows 110 in workflow instance registry 126. Workflow runtime 118 stores in workflow instance registry 126 instances of the suggested workflows 110 that were run by workflow runtime 118. Instances of the suggested workflows 110 run by workflow runtime 118 and the history of the results of running the suggested workflows 110 may be subsequently retrieved from workflow instance registry 126 to reuse the instances and to improve upon the instances.

Based on the results stored in workflow instance registry 126, a particular workflow of the suggested workflows 110 may be selected by a user to be an analytic solution that satisfies a business objective.

The functionality of the components of computer system 102 is further described below in the discussions relative to FIG. 2 and FIG. 6.

Process for Composing an Analytic Solution

Figure 2:
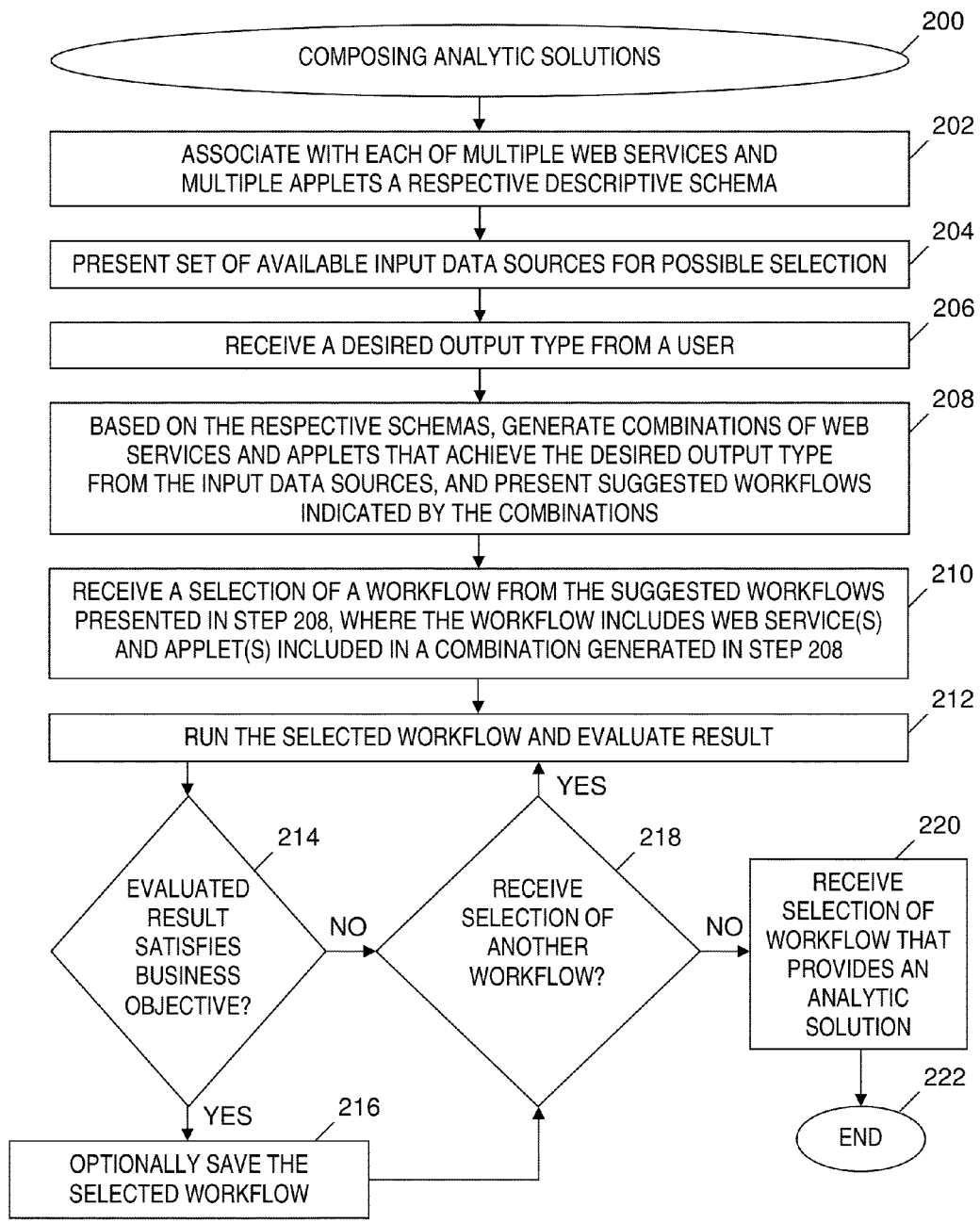
FIG. 2 is a flowchart of a process of generating an analytic solution, where the process is implemented by the system of FIG. 1, in accordance with embodiments of the present invention.

FIG. 2 is a flowchart of a process of generating an analytic solution, where the process is implemented by the system of FIG. 1, in accordance with embodiments of the present invention. The process of generating an analytic solution starts at step 200. In step 202, computer system 102 (see FIG. 1) associates with each of multiple web services 120 (see FIG. 1) and multiple web-based applets a respective descriptive schema. The respective descriptive schemas describe the inputs and outputs required by the web services and web-based applets.

In one embodiment, the set of web services 120 (see FIG. 1) is created prior to step 202 for various analytic techniques and tools used in inferring insight (i.e., knowledge discovery) from a large collection of data. The web services for the various analytic techniques and tools may comprise methods to classify the data in the large collection, search the data in the large collection, provide co-occurrence tables of frequently found words and groups of words in the large collection of data, etc. In addition, each external data source can also be incorporated and exposed as a web service of the set of web services 120 (see FIG. 1).

In step 204, computer system 102 (see FIG. 1) presents (e.g., initiates a display of) a set of available input data sources for possible selection by workflow composer 104 (see FIG. 1) as inputs to a workflow.

In step 206, workflow composer 104 (see FIG. 1) receives from a user a desired output type (i.e., a type of output from a workflow that is desired by the user of computer system 102 in FIG. 1). In one embodiment, step 206 includes workflow composer 104 (see FIG. 1) receiving from a user the desired output type and a desired visualization, where the visualization is a specific kind (i.e., sub-type) of output included in the desired output type. For example, the desired output type may be "graph" and the visualization may be "scatter plot," which is a specific kind of graph.

In step 208, based on the respective descriptive schemas associated in step 202, workflow composer 104 (see FIG. 1) generates combinations of web services and web-based applets. Each generated combination includes a corresponding workflow of suggested workflows 110 (see FIG. 1) that specifies an ordered arrangement of web-based applet(s) and web service(s) included in web services 120 (see FIG. 1) that, when run, generate a result of the desired output type received in step 206, where the result is generated from an input data source of the set of available input data sources presented in step 204. The ordered arrangement of web-based applet(s) and web service(s) specified by the workflow is based on the output of an i-th item of the arrangement of web-based applet(s) and web service(s) being the input to an (i+1)-th item of the arrangement, where the inputs and outputs conform to the inputs and outputs specified by the descriptive schemas associated with the web-based applet(s) and web service(s), where i is an integer greater than or equal to 1 and less than the total number of web-based applet(s) and web service(s) in the arrangement.

In one embodiment, workflow composer 104 (see FIG. 1) in step 208 first generates a set of all possible combinations of the web services and web-based applets, and subsequently prunes the set of all possible combinations to retain only the combinations that include workflows that, when run, generate results of the desired output type.

Also in step 208, workflow composer 104 presents (e.g., initiates a display of) suggested workflows 110 (see FIG. 1), which are included in the generated combinations.

In step 210, workflow composer 104 (see FIG. 1) receives a selection of a workflow (hereinafter in the discussion of FIG. 2, "the selected workflow"), which includes web service(s) and web-based applet(s), where the selected workflow is selected from the suggested workflows 110 (see FIG. 1) presented in step 208. In one embodiment, the selected workflow indicated by the selection received in step 210 includes a selection of one of the input data sources presented in step 204. After step 210 and prior to step 212, workflow composer 104 (see FIG. 1) sends the selected workflow to workflow runtime 118 (see FIG. 1).

In step 212, workflow runtime 118 (see FIG. 1) runs the selected workflow and evaluates a result of running of the workflow.

In step 214, a user of computer system 102 (see FIG. 1) determines whether the result evaluated in step 212 satisfies a business objective. If the user in step 214 determines that the result satisfies the business objective, then the Yes branch of step 214 is taken and step 216 is performed. In step 216, workflow runtime 118 (see FIG. 1) optionally saves the selected workflow. In one embodiment, workflow runtime 118 (see FIG. 1) stores the selected workflow in workflow instance registry 126 (see FIG. 1).

Inquiry step 218 follows step 216 and also follows the user determining in step 214 that the result evaluated in step 212 does not satisfy the business objective. In step 218, workflow composer 104 (see FIG. 1) determines whether a selection of another workflow of suggested workflows 110 (see FIG. 1) is received by workflow composer 104 (see FIG. 1). If workflow composer 104 (see FIG. 1) determines in step 218 that a selection of another workflow (hereinafter in the discussion of FIG. 2, also referred to as "the most recent selected workflow") is received, then the Yes branch of step 218 is taken and the process loops back to step 212 with workflow runtime 118 (see FIG. 1) running the most recent selected workflow and a user evaluating the result of running the most recent selected workflow.

If workflow composer 104 (see FIG. 1) determines in step 218 that a selection of another workflow is not received because all workflows of suggested workflows 110 (see FIG. 1) have been run in step 212 or because the user indicates that no further workflows of suggested workflows 110 (see FIG. 1) are to be run, then the No branch of step 218 is taken and step 220 is performed.

In step 220, if results of multiple workflows were found to satisfy the business objective (see the Yes branch of step 214), then computer system 102 (see FIG. 1) receives a selection of one of the multiple workflows whose results were found to satisfy the business objective. If only one result of one workflow was found to satisfy the business objective, then the selection of the one workflow is received by computer system 102 (see FIG. 1) in step 220. The selection received in step 220 indicates that the workflow provides an analytic solution. Following step 220, the process of FIG. 2 ends at step 222.

In one embodiment, the selected workflow is saved in step 216 and selected in step 220 as the analytic solution so that the selected workflow is reusable. The selected and saved workflow may be re-used by running the workflow again after the input data has changed. Because the input data has changed, running the selected and saved workflow again causes a change in the result of running the workflow. Furthermore, the selected workflow may be re-used by editing the workflow to produce a different analytic process.

Figure 3:
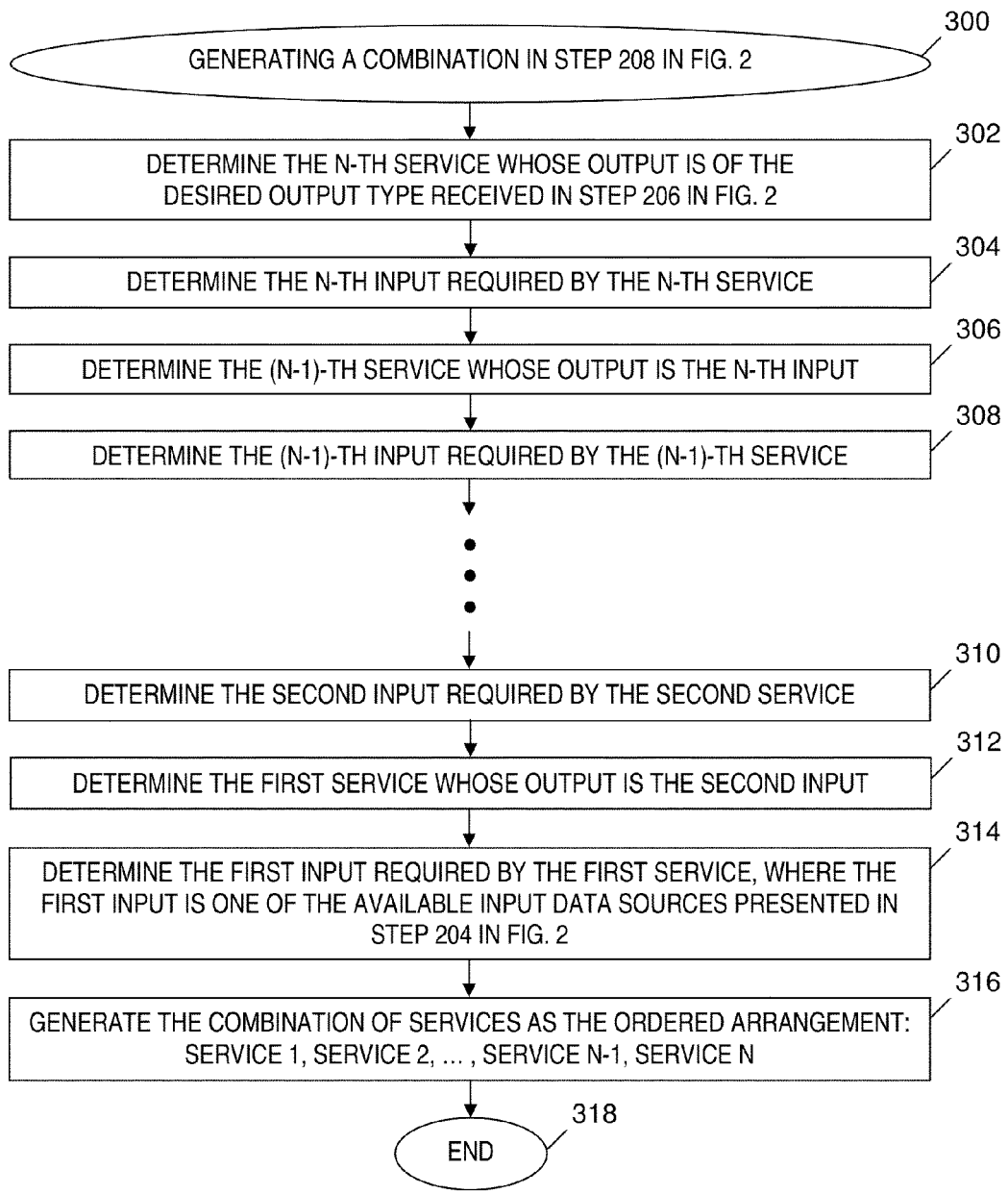
FIG. 3 is a flowchart of a process of generating a combination of web services and applets within the process of FIG. 2, in accordance with embodiments of the present invention.

FIG. 3 is a flowchart of a process of generating a combination of web services and applets within the process of FIG. 2, in accordance with embodiments of the present invention. The process of FIG. 3 starts at step 300. Hereinafter in the discussion of FIG. 3, "service" is used to mean a web service or an applet. In step 302, workflow composer 104 (see FIG. 1) determines an N-th service whose output is of the desired output type received in step 206 in FIG. 2. In the discussion of FIG. 3, N is an integer and N>1. The N-th service determined in step 302 is an N-th service in an ordered arrangement of N services that indicates a workflow.

In step 304, workflow composer 104 (see FIG. 1) determines the N-th input required by the N-th service determined in step 302. In step 306, workflow composer 104 (see FIG. 1) determines the (N−1)-th service whose output is the N-th input. In step 308, workflow composer 104 (see FIG. 1) determines the (N−1)-th input required by the (N−1)-th service determined in step 306.

The process of FIG. 3 continues performing steps (not shown) in the pattern provided by steps 306 and 308, using (N−2), (N−3), etc., as necessary, which are followed by step 310 in which workflow composer 104 (see FIG. 1) determines the second input required by the second service, where the second service is determined by the workflow composer 104 (see FIG. 1) in a step (not shown) immediately preceding step 310.

In step 312, workflow composer 104 (see FIG. 1) determines a first service whose output is the second input determined in step 310. In step 314, workflow composer 104 (see FIG. 1) determines the first input required by the first service determined in step 312. The first input determined in step 314 is one of the available input data sources presented in step 204 (see FIG. 2).

In step 316, workflow composer 104 (see FIG. 1) generates the combination of services as the ordered arrangement: first service (i.e., the service determined in step 312), second service . . . (N−1)-th service (i.e., the service determined in step 306), N-th service (i.e., the service determined in step 302). The process of FIG. 3 ends at step 318.

Figure 4:
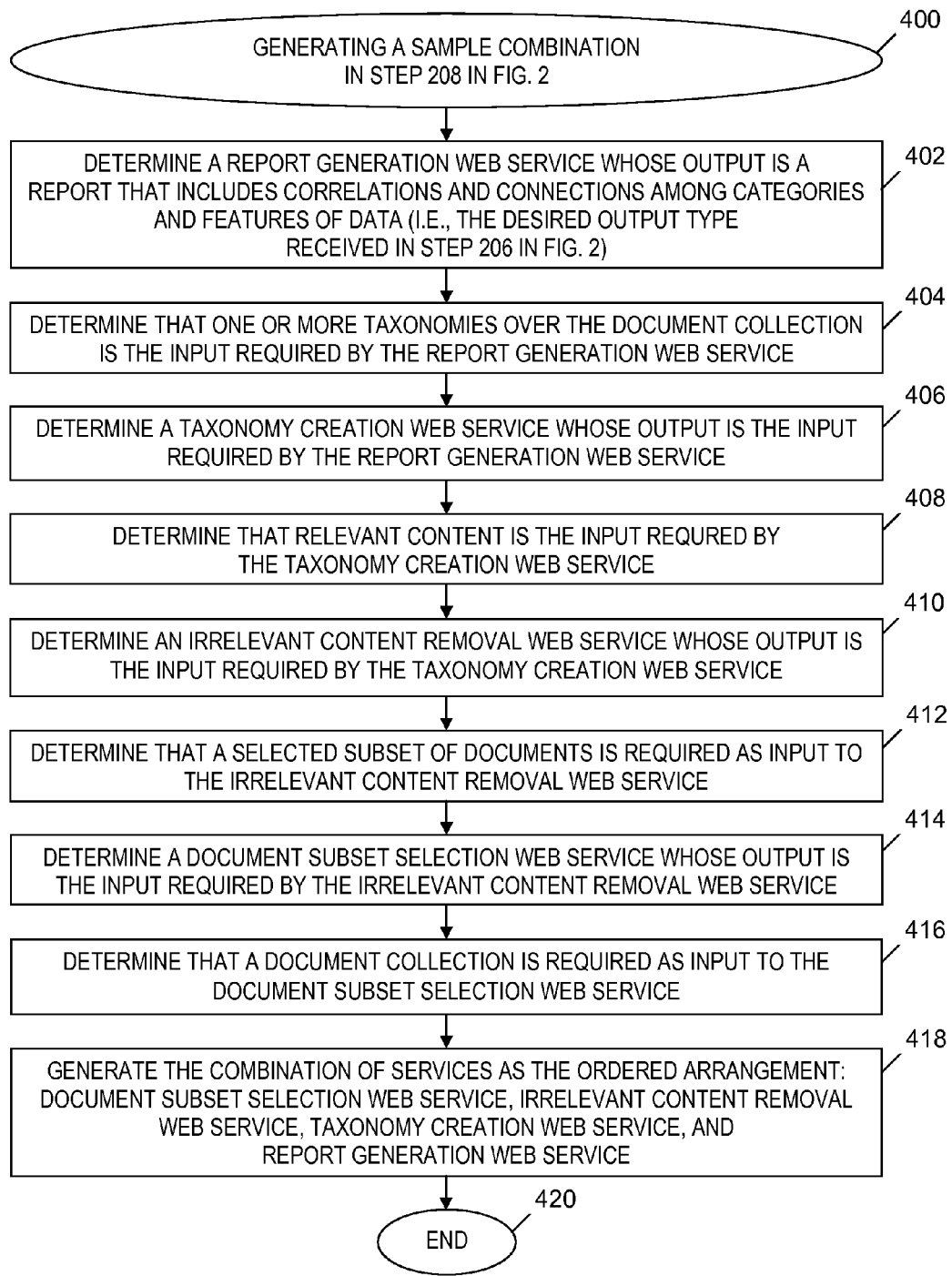
FIG. 4 is a flowchart of an example of the process of FIG. 3, in accordance with embodiments of the present invention.

FIG. 4 is a flowchart of an example of the process of FIG. 3, in accordance with embodiments of the present invention. The example shown in FIG. 4 considers the analytic workflow presented below:

1. Selection stage: Select a subset of documents from a collection of documents. The selection of the subset of documents may be based on one or more of: keyword, structure, taxonomy category (i.e., theme).
2. Explore/expunge stage: Systematically remove irrelevant content from the selected subset of documents using clustering or rule-based filters.
3. Understand stage: Create one or more taxonomies that divide the data resulting from the explore/expunge stage into meaningful groups characterized by categories and features. The creation of the one or more taxonomies may use clustering, keywords or structure.
4. Report stage (desired end state): Generate a report that includes correlations and connections among the categories and features.

The process of FIG. 4 begins at step 400. In step 402, workflow composer 104 (see FIG. 1) determines a report generation web service whose output is a report that includes correlations and connections among categories and features of data in a collection of documents. The report is the desired output type received in step 206 (see FIG. 2) (i.e., the desired end state).

In step 404, workflow composer 104 (see FIG. 1) determines that one or more taxonomies over a document collection are the input required by the report generation web service determined in step 402.

In step 406, workflow composer 104 (see FIG. 1) determines a taxonomy creation web service whose output is the input required by the report generation web service determined in step 402 (i.e., whose output is the aforementioned one or more taxonomies). In step 406, workflow composer 104 (see FIG. 1) determines the taxonomy creation web service by receiving a selection from among options for creating taxonomies, such as clustering, keywords, or structure.

In step 408, workflow composer 104 (see FIG. 1) determines that relevant content is the input required by the taxonomy creation web service determined in step 406.

In step 410, workflow composer 104 (see FIG. 1) determines an irrelevant content removal web service whose output is the input required by the taxonomy creation web service determined in step 406 (i.e., whose output is the aforementioned relevant content). In step 410, workflow composer 104 (see FIG. 1) determines the irrelevant content removal web service by receiving a selection from among options for removing irrelevant content, such as clustering or a rule-based technique.

In step 412, workflow composer 104 (see FIG. 1) determines that a selected subset of documents is required as input to the irrelevant content removal web service determined in step 410.

In step 414, workflow composer 104 (see FIG. 1) determines a document subset selection web service whose output is the input required by the irrelevant content removal web service determined in step 410. In step 414, workflow composer 104 (see FIG. 1) determines a document subset web service by receiving a selection from among options for selecting a subset of documents, such as by keyword, structure, or taxonomy category.

In step 416, workflow composer 104 (see FIG. 1) determines that a document collection is required as input to the document subset selection web service determined in step 414. The document collection determined in step 416 is one of the available input data sources presented in step 204 (see FIG. 2).

In step 418, workflow composer 104 (see FIG. 1) generates a combination of services as the ordered arrangement: report generation web service, taxonomy creation web service, irrelevant content removal web service, document subset selection web service. The process of FIG. 4 ends at step 420.

Figure 5:
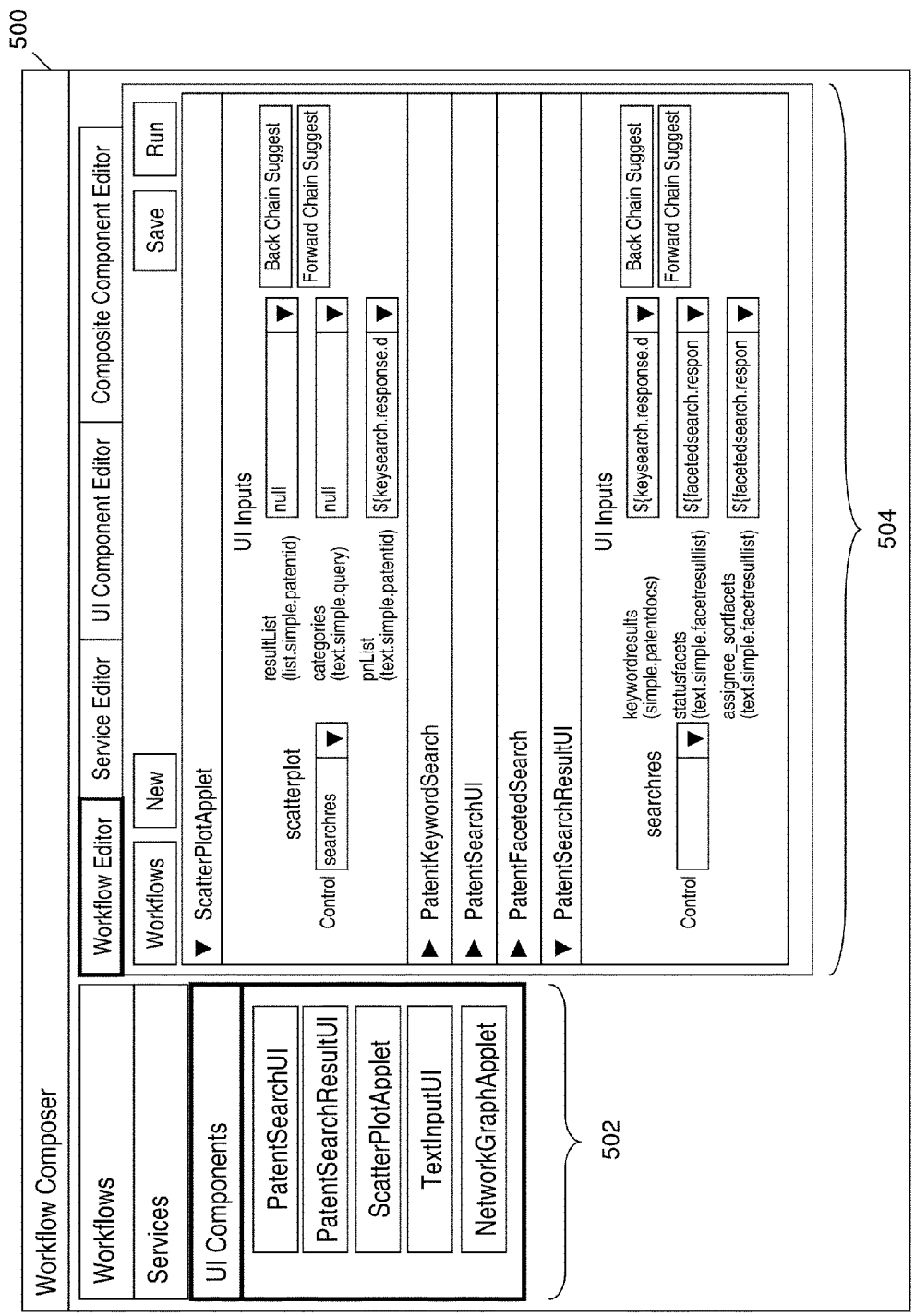
FIG. 5 is a sample interface of the workflow composer included in the system of FIG. 1, which may be used for generating an analytic process in the process of FIG. 2, in accordance with embodiments of the present invention.

FIG. 5 is a sample interface of the workflow composer included in the system of FIG. 1, which may be used for generating an analytic process in the process of FIG. 2, in accordance with embodiments of the present invention. Embodiments of the present invention provide a graphical user interface (GUI), such as sample interface 500, to help the end user create an analytic process that is needed to infer insight. In one embodiment, a user composes an analytic process by selecting individual components 502, such as previously specified workflows, services and UI components, and may edit these components in a workflow editor 504. Each suggested workflow 110 (see FIG. 1) composed by workflow composer 104 (see FIG. 1) may be an arrangement of web service(s) and web-based applet(s) into a connected directed graph, where a node of the graph is a web service (or web-based applet) and an edge of the graph is an invocation of a web service (or web-based applet) that passes data as the output of one web service (or web-based applet) to the input of another web service (or web-based applet). The data passed can either come from another web service or from a person. Interface 500 may allow the user to add the web services that are needed for an analysis and to connect the web services together to form the analytic process. In the sample shown in FIG. 5, the user added UI components that include PatentSearchUI, PatentSearchResultUI, ScatterPlotApplet, TextInputUI and NetworkGraphApplet, as shown in the list of components 502.

In another embodiment, a user utilizes interface 500 to select a goal (i.e., a desired type of output from a workflow that specifies what the result data set should look like) and an input data source, and workflow composer 104 (see FIG. 1) uses back chain reasoning to generate suggested workflows 110 (see FIG. 1) that provide the middle steps between the input data source and the goal. Since an objective of embodiments of the present invention is to try to help the user gather insight, the user may use interface 500 to specify a type of a result data set, as determined by the results of known analytic services. The type of the result data set represents the end-goal for the analysis of embodiments of the present invention. That is, the user starts by selecting the goal for the analysis before defining the middle steps that constitute the analytic process.

Figure 6:
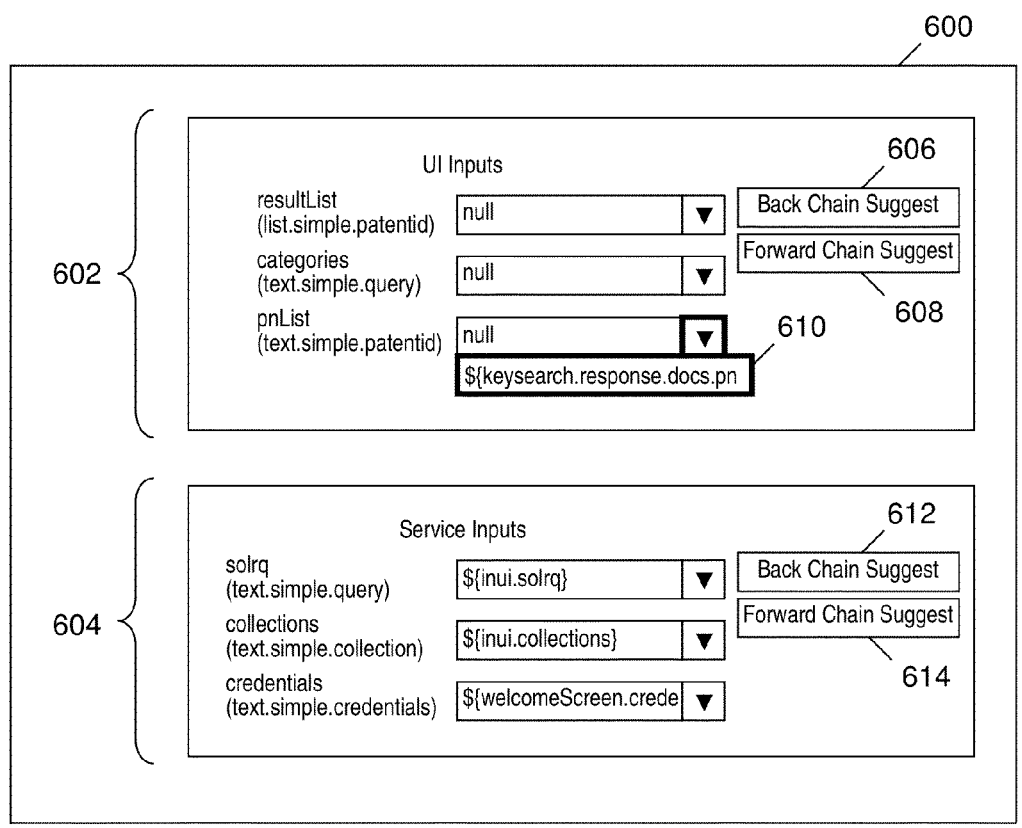
FIG. 6 is a sample interface that includes input to the workflow composer included in the system of FIG. 1, which may be used for generating one or more analytic processes in the process of FIG. 2, in accordance with embodiments of the present invention.

FIG. 6 is a sample interface that includes input to the workflow composer included in the system of FIG. 1, which may be used for generating one or more analytic processes in the process of FIG. 2, in accordance with embodiments of the present invention. GUI interface 600 may be a portion of interface 500 (see FIG. 5) provided by workflow composer 104 (see FIG. 1) and includes a first section 602 having UI inputs and a second section 604 having Service inputs. First section 602 includes a button 606 Back Chain Suggest that, when selected by a user, initiates a back chain reasoning process to generate analytic process(es) based on the UI inputs included in interface 600. First section 602 also includes a button 608 for initiating a forward chain suggest process for generating analytic process(es) based on the inputs included in interface 600. Interface 600 includes a selection 610 that indicates that the analytic process(es) to be generated will perform a keyword search and obtain the result of the keyword search as a list of patent documents.

Second section 604 includes service input selections already made by the user. Further, second section 604 includes a button 612 Back Chain Suggest that, when selected by a user, initiates a back chain reasoning process to generate analytic process(es) based on the Service inputs included in interface 600. Second section 604 also includes a button 614 for initiating a forward chain suggest process for generating analytic process(es) based on the inputs included in interface 600.

Figure 7:
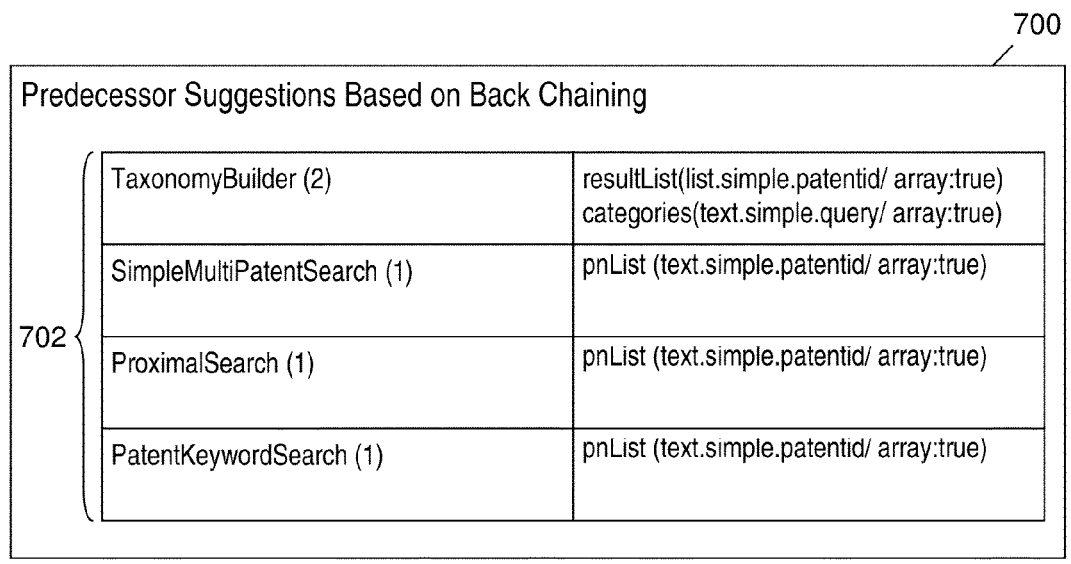
FIG. 7 is a sample view that includes output from the workflow composer included in the system of FIG. 1, which may result from the process of FIG. 2, in accordance with embodiments of the present invention.

FIG. 7 is a sample view that includes output from the workflow composer included in the system of FIG. 1, which may result from the process of FIG. 2, in accordance with embodiments of the present invention. A view 700 includes steps of suggested workflows resulting from a selection of the Back Chain Suggest button on interface 600 (see FIG. 6), which runs a back chain reasoning process on the inputs included in interface 600 (see FIG. 6). View 700 includes three options of services that can be run in a first step of a suggested workflow: SimpleMultiPatentSearch, ProximalSearch, and PatentKeywordSearch. It should be noted that the indicator of "(1)" after the identifiers of SimpleMultiPatentSearch, ProximalSearch, and PatentKeywordSearch indicate the services that may be the first step of the suggested workflow. Furthermore, view 500 includes one option of a service that can be run in a second step of a suggested workflow: TaxonomyBuilder. The indicator of "(2)" after the identifier of TaxonomyBuilder indicates the service that may be the second step of the suggested workflow. With the results in view 500, the user can commit on a possible set of middle steps of a suggested workflow by selecting the correct connections between the web services that had been chosen. Subsequently, the user may save the results (i.e., the suggested workflow selected by the user) and view or run the selected suggested workflow if the analytic process is complete. In one embodiment, workflow runtime 118 (see FIG. 1) is invoked to run the selected suggested workflow.

After saving, viewing and running a suggested workflow, the user may iterate over other intermediary steps of the workflow in order to refine the resulting analytic process. The user may try various middle steps and review the results from running the workflows that include the various middle steps. When a result that satisfies a business objective is discovered by trying a particular set of middle steps, the user can save the workflow having the set of middle steps so that the workflow may be run in the future. In one embodiment, the workflow is saved in workflow instance registry 126 (see FIG. 1).

Figure 8:
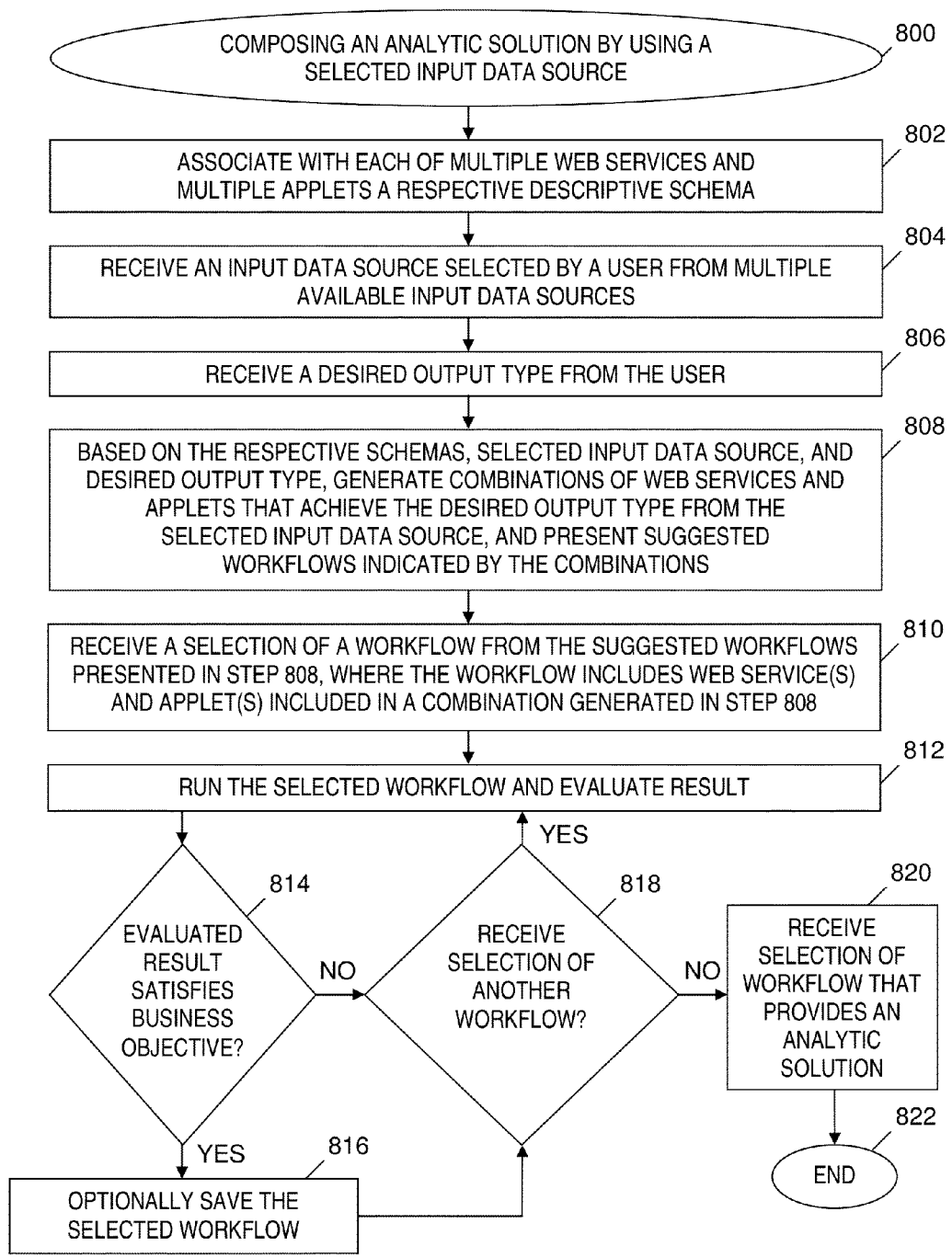
FIG. 8 is a flowchart of a process of generating an analytic solution by using a selected input data source, where the process is implemented by the system of FIG. 1, in accordance with embodiments of the present invention.

FIG. 8 is a flowchart of a process of generating an analytic solution by using a selected input data source, where the process is implemented by the system of FIG. 1, in accordance with embodiments of the present invention. The process of generating an analytic solution by using a selected input data source starts at step 800. In step 802, computer system 102 (see FIG. 1) associates with each of multiple web services 120 (see FIG. 1) and multiple web-based applets a respective descriptive schema. The respective descriptive schemas describe the inputs and outputs required by the web services and web-based applets. In one embodiment, the set of web services 120 (see FIG. 1) is created prior to step 802 for various analytic techniques and tools used in inferring insight (i.e., knowledge discovery) from a large collection of data.

In step 804, workflow composer 104 (see FIG. 1) receives an input data source selected by a user from multiple available input data sources as an input to a workflow.

In step 806, workflow composer 104 (see FIG. 1) receives from a user a desired output type. In one embodiment, step 806 includes workflow composer 104 (see FIG. 1) receiving from a user the desired output type and a desired visualization, where the visualization is a specific kind (i.e., sub-type) of output included in the desired output type. For example, the desired output type may be "graph" and the visualization may be "scatter plot," which is a specific kind of graph.

In step 808, based on the respective descriptive schemas associated in step 802, the input data source received in step 804 and the desired output type received in step 806, workflow composer 104 (see FIG. 1) generates combinations of web services and web-based applets. In one embodiment, each generated combination includes a corresponding workflow of suggested workflows 110 (see FIG. 1) that specifies an ordered arrangement of web-based applet(s) and web service(s) included in web services 120 (see FIG. 1) that, when run, generate a result of the desired output type received in step 806, where the result is generated from the input data source received in step 804. The ordered arrangement of web-based applet(s) and web service(s) specified by the workflow is based on the output of an i-th item of the arrangement of web-based applet(s) and web service(s) being the input to an (i+1)-th item of the arrangement, where the inputs and outputs conform to the inputs and outputs specified by the descriptive schemas associated with the web-based applet(s) and web service(s), where i is an integer greater than or equal to 1 and less than the total number of web-based applet(s) and web service(s) in the arrangement.

In one embodiment, workflow composer 104 (see FIG. 1) in step 808 first generates a set of all possible combinations of the web services and web-based applets that start with a web service or applet whose required input can be the input data source received in step 804, and subsequently prunes the aforementioned set of all possible combinations to retain only the combinations that include workflows that, when run, generate results of the desired output type.

Also in step 808, workflow composer 104 presents (e.g., initiates a display of) suggested workflows 110 (see FIG. 1), which are included in the generated combinations.

In step 810, workflow composer 104 (see FIG. 1) receives a selection of a workflow (hereinafter in the discussion of FIG. 8, "the selected workflow"), which includes web service (s) and web-based applet(s), where the selected workflow is selected from the suggested workflows 110 (see FIG. 1) presented in step 808. After step 810 and prior to step 812, workflow composer 104 (see FIG. 1) sends the selected workflow to workflow runtime 118 (see FIG. 1).

In step 812, workflow runtime 118 (see FIG. 1) runs the selected workflow and evaluates a result of running of the workflow.

In step 814, a user of computer system 102 (see FIG. 1) determines whether the result evaluated in step 812 satisfies a business objective. If the user in step 814 determines that the result satisfies the business objective, then the Yes branch of step 814 is taken and step 816 is performed. In step 816, workflow runtime 118 (see FIG. 1) optionally saves the selected workflow. In one embodiment, workflow runtime 118 (see FIG. 1) stores the selected workflow in workflow instance registry 126 (see FIG. 1).

Inquiry step 818 follows step 816 and also follows the user determining in step 814 that the result evaluated in step 812 does not satisfy the business objective. In step 818, workflow composer 104 (see FIG. 1) determines whether a selection of another workflow of suggested workflows 110 (see FIG. 1) is received by workflow composer 104 (see FIG. 1). If workflow composer 104 (see FIG. 1) determines in step 818 that a selection of another workflow (hereinafter in the discussion of FIG. 8, also referred to as "the most recent selected workflow") is received, then the Yes branch of step 818 is taken and the process loops back to step 812 with workflow runtime 118 (see FIG. 1) running the most recent selected workflow and a user evaluating the result of running the most recent selected workflow.

If workflow composer 104 (see FIG. 1) determines in step 818 that a selection of another workflow is not received because all workflows of suggested workflows 110 (see FIG. 1) have been run in step 812 or because the user indicates that no further workflows of suggested workflows 110 (see FIG. 1) are to be run, then the No branch of step 818 is taken and step 820 is performed.

In step 820, if results of multiple workflows were found to satisfy the business objective (see the Yes branch of step 814), then computer system 102 (see FIG. 1) receives a selection of one of the multiple workflows whose results were found to satisfy the business objective. If only one result of one workflow was found to satisfy the business objective, then the selection of the one workflow is received by computer system 102 (see FIG. 1) in step 820. The selection received in step 820 indicates that the workflow provides an analytic solution. Following step 820, the process of FIG. 8 ends at step 822.

In one embodiment, the selected workflow is saved in step 816 and selected in step 820 as the analytic solution so that the selected workflow is reusable. The selected and saved workflow may be re-used by running the workflow again after the input data has changed. Because the input data has changed, running the selected and saved workflow again causes a change in the result of running the workflow. Furthermore, the selected workflow may be re-used by editing the workflow to produce a different analytic process.

In one embodiment, each of the suggested workflows indicated by the combinations generated in step 808 includes one or more constraints at the beginning and/or end of the workflow. For example, the process of FIG. 8 may be modified to include one or more both of the following steps: (1) a step (not shown) of the workflow composer 104 (see FIG. 1) receiving a first series of one or more selected web services and/or web-based applets that must be included at the beginning of each suggested workflow, and (2) a step (not shown) of the workflow composer 104 (see FIG. 1) receiving a second series of one or more selected web services and/or web-based applets that must be included at the end of each suggested workflow. The output of the last element of the first series of web services and/or web-based applets is the required input of the first web service or web-based applet in each of the generated combinations. The required input of first element of the second series of web services and/or web-based applets is the output of the last web service or web-based applet in each of the generated combinations.

Figure 9:
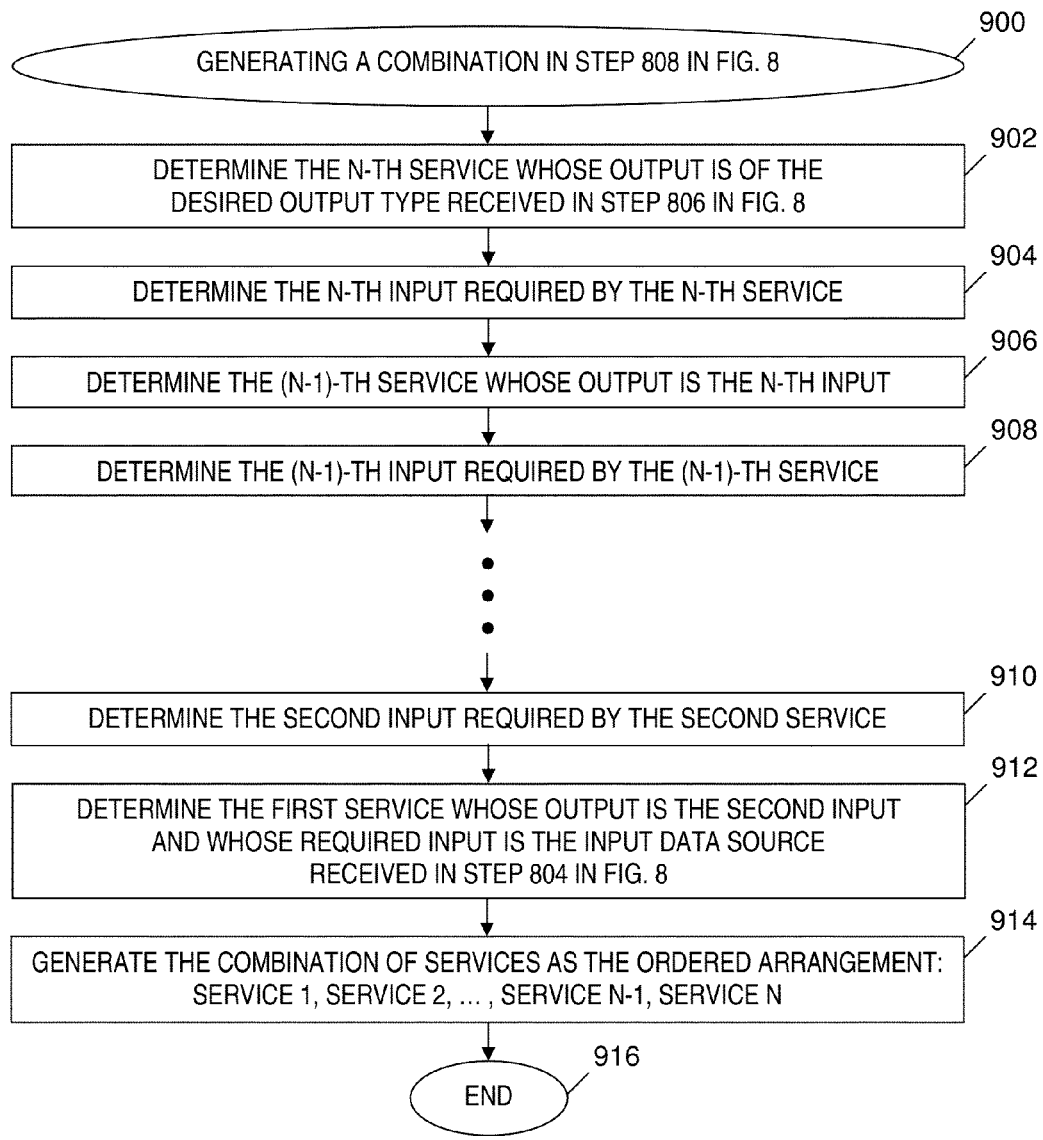
FIG. 9 is a flowchart of a process of generating a combination of web services and applets within the process of FIG. 8, in accordance with embodiments of the present invention.

FIG. 9 is a flowchart of a process of generating a combination of web services and applets within the process of FIG. 8, in accordance with embodiments of the present invention. The process of FIG. 9 starts at step 900. Hereinafter, in the discussion of FIG. 9, "service" is used to mean a web service or an applet. In step 902, workflow composer 104 (see FIG. 1) determines an N-th service whose output is of the desired output type received in step 806 in FIG. 8. In the discussion of FIG. 9, N is an integer and N>1. The N-th service determined in step 902 is an N-th service in an ordered arrangement of N services that indicates a workflow.

In step 904, workflow composer 104 (see FIG. 1) determines the N-th input required by the N-th service determined in step 902. In step 906, workflow composer 104 (see FIG. 1) determines the (N−1)-th service whose output is the N-th input. In step 908, workflow composer 104 (see FIG. 1) determines the (N−1)-th input required by the (N−1)-th service determined in step 906.

The process of FIG. 9 continues performing steps (not shown) in the pattern provided by steps 906 and 908, using (N−2), (N−3), etc., as necessary, which are followed by step 910 in which workflow composer 104 (see FIG. 1) determines the second input required by the second service, where the second service is determined by the workflow composer 104 (see FIG. 1) in a step (not shown) immediately preceding step 910.

In step 912, workflow composer 104 (see FIG. 1) determines a first service whose output is the second input determined in step 910 and whose required input is the input data source received in step 804 in FIG. 8.

In step 914, workflow composer 104 (see FIG. 1) generates the combination of services as the ordered arrangement: first service (i.e., the service determined in step 912), second service . . . (N−1)-th service (i.e., the service determined in step 906), N-th service (i.e., the service determined in step 902). The process of FIG. 9 ends at step 916.

Figure 10:
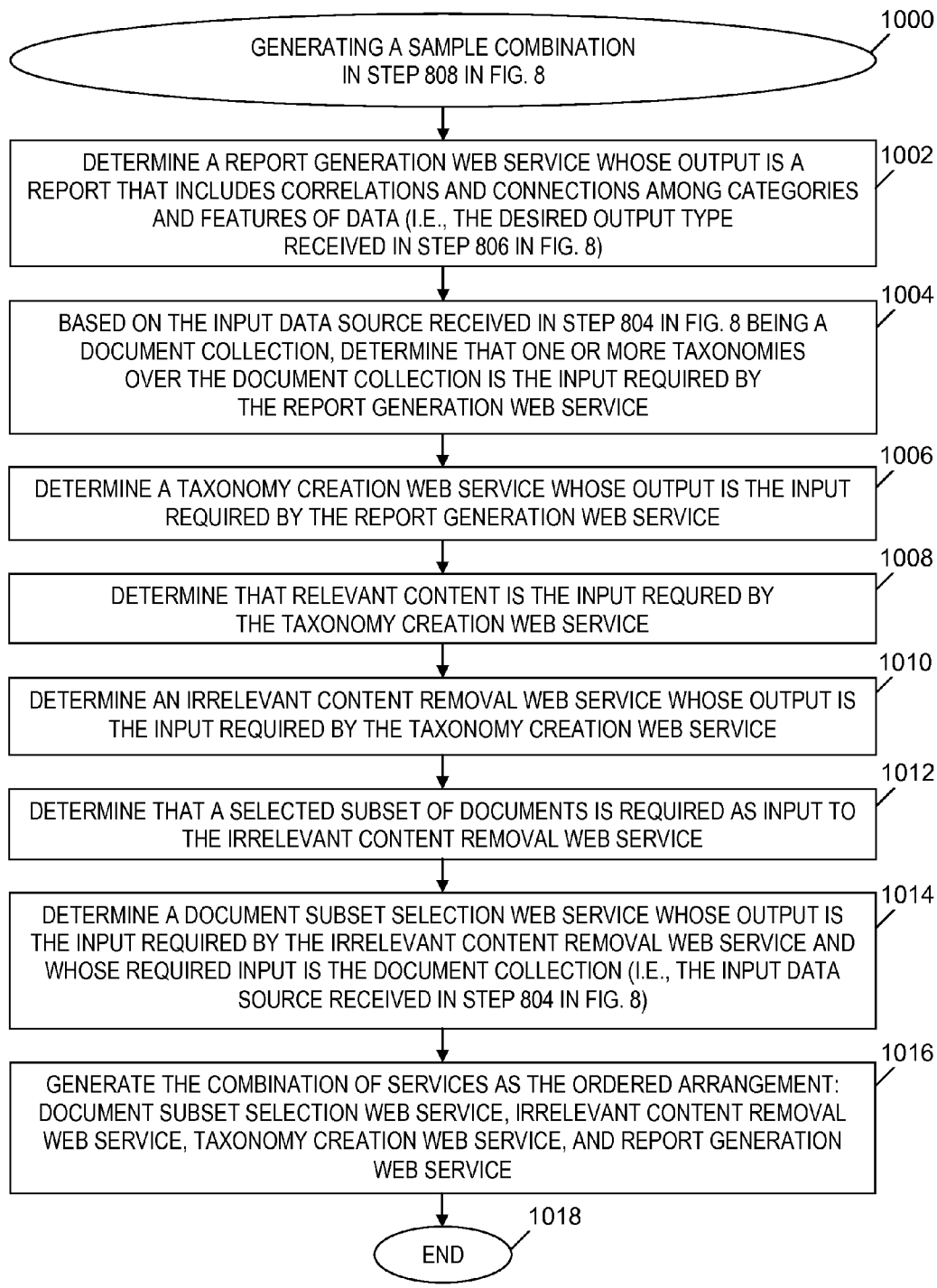
FIG. 10 is a flowchart of an example of the process of FIG. 9, in accordance with embodiments of the present invention.

FIG. 10 is a flowchart of an example of the process of FIG. 9, in accordance with embodiments of the present invention. The process of FIG. 10 begins at step 1000. In step 1002, workflow composer 104 (see FIG. 1) determines a report generation web service whose output is a report that includes correlations and connections among categories and features of data. The report is the desired output type received in step 806 (see FIG. 8).

In step 1004, based on the input data source received in step 804 (see FIG. 8) being a document collection, workflow composer 104 (see FIG. 1) determines that one or more taxonomies over the document collection is the input required by the report generation web service determined in step 1002.

In step 1006, workflow composer 104 (see FIG. 1) determines a taxonomy creation web service whose output is the input required by the report generation web service determined in step 1002.

In step 1008, workflow composer 104 (see FIG. 1) determines that relevant content is the input required by the taxonomy creation web service determined in step 1006.

In step 1010, workflow composer 104 (see FIG. 1) determines an irrelevant content removal web service whose output is the input required by the taxonomy creation web service determined in step 1006.

In step 1012, workflow composer 104 (see FIG. 1) determines that a selected subset of documents is required as input to the irrelevant content removal web service determined in step 1010.

In step 1014, workflow composer 104 (see FIG. 1) determines a document subset selection web service whose output is the input required by the irrelevant content removal web service determined in step 1010 and whose required input can be the document collection (i.e., the input data source received in step 804 in FIG. 8).

In step 1016, workflow composer 104 (see FIG. 1) generates a combination of services as the ordered arrangement: report generation web service, taxonomy creation web service, irrelevant content removal web service, document subset selection web service. The process of FIG. 10 ends in step 1018.

Computer System

Figure 11:
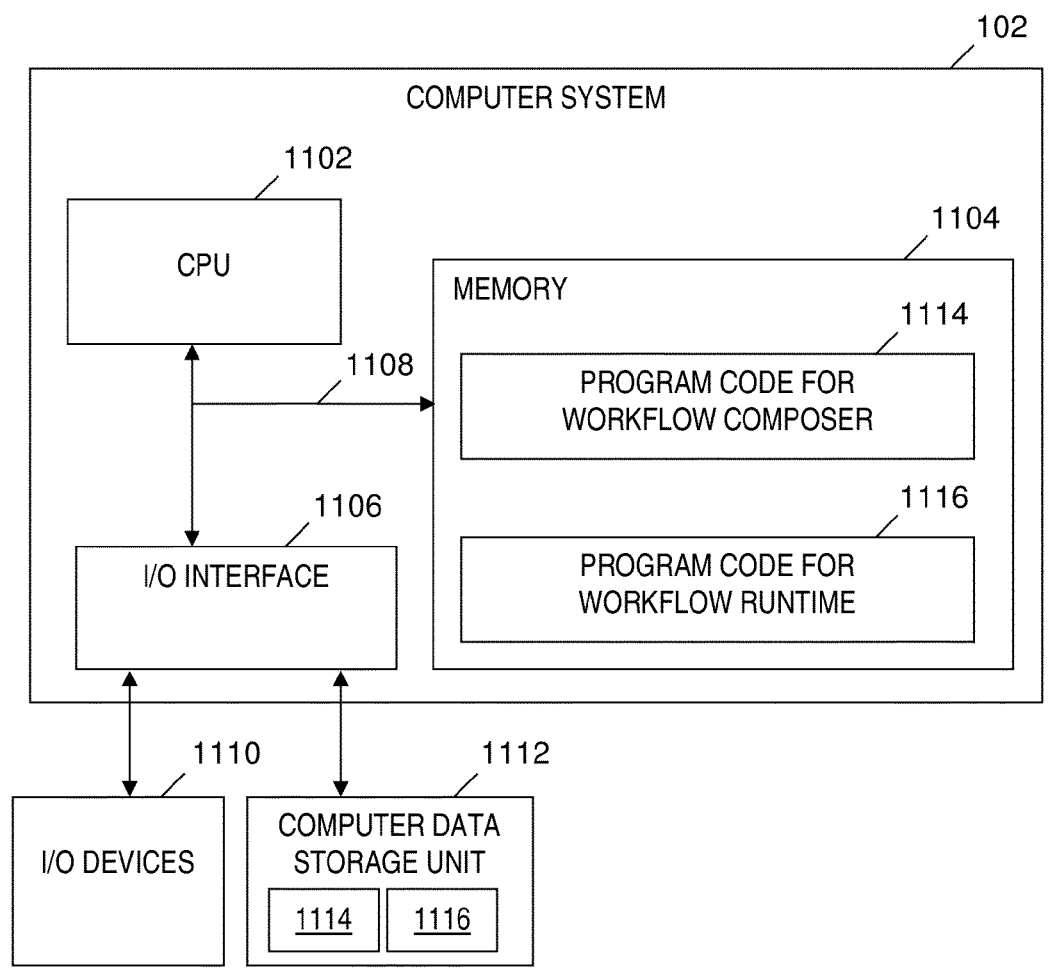
FIG. 11 is a block diagram of a computer system that is included in the system of FIG. 1 and that implements the process of FIG. 2 or the process of FIG. 8, in accordance with embodiments of the present invention.

FIG. 11 is a block diagram of a computer system that is included in the system of FIG. 1 and that implements the process of FIG. 2 or the process of FIG. 8, in accordance with embodiments of the present invention. Computer system 102 generally comprises a central processing unit (CPU) 1102, a memory 1104, an input/output (I/O) interface 1106, and a bus 1108. Further, computer system 102 is coupled to I/O devices 1110 and a computer data storage unit 1112. CPU 1102 performs computation and control functions of computer system 102, including carrying out instructions included in program code 1114 and program code 1116 to perform a method of generating an analytic solution, where the instructions are carried out by CPU 1102 via memory 1104. CPU 1102 may comprise a single processing unit, or be distributed across one or more processing units in one or more locations (e.g., on a client and server). In one embodiment, program code 1114 includes code for workflow composer 104 (see FIG. 1) and program code 1116 includes code for workflow runtime 118 (see FIG. 1).

Memory 1104 may comprise any known computer-readable storage medium, which is described below. In one embodiment, cache memory elements of memory 1104 provide temporary storage of at least some program code (e.g., program code 1114 and 1116) in order to reduce the number of times code must be retrieved from bulk storage while instructions of the program code are carried out. Moreover, similar to CPU 1102, memory 1104 may reside at a single physical location, comprising one or more types of data storage, or be distributed across a plurality of physical systems in various forms. Further, memory 1104 can include data distributed across, for example, a local area network (LAN) or a wide area network (WAN).

I/O interface 1106 comprises any system for exchanging information to or from an external source. I/O devices 1110 comprise any known type of external device, including a display device (e.g., monitor), keyboard, mouse, printer, speakers, handheld device, facsimile, etc. Bus 1108 provides a communication link between each of the components in computer system 102, and may comprise any type of transmission link, including electrical, optical, wireless, etc.

I/O interface 1106 also allows computer system 102 to store information (e.g., data or program instructions such as program code 1114 and 1116) on and retrieve the information from computer data storage unit 1112 and/or another computer data storage unit (not shown) coupled to computer system 102. Computer data storage unit 1112 may comprise any known computer-readable storage medium, which is described below. For example, computer data storage unit 1112 may be a non-volatile data storage device, such as a magnetic disk drive (i.e., hard disk drive) or an optical disc drive (e.g., a CD-ROM drive which receives a CD-ROM disk).

Memory 1104 and/or storage unit 1112 may store computer program code 1114 and 1116 that includes instructions that are carried out by CPU 1102 via memory 1104 to generate an analytic solution. Although FIG. 11 depicts memory 1104 as including program code 1114 and 1116, the present invention contemplates embodiments in which memory 1104 does not include all of code 1114 simultaneously, but instead at one time includes only a portion of code 1114. Similarly, the present invention contemplates embodiments in which memory 1104 does not include all of code 1116 simultaneously, but instead at one time includes only a portion of code 1116. Furthermore, in one embodiment, memory 1104 does not include code 1114 and 1116 simultaneously, but instead at one time includes only code 1114 (or a portion of code 1114) or only code 1116 (or a portion of code 1116).

Further, memory 1104 may include other systems not shown in FIG. 11, such as an operating system (e.g., Linux) that runs on CPU 1102 and provides control of various components within and/or connected to computer system 102.

Storage unit 1112 and/or one or more other computer data storage units (not shown) that are coupled to computer system 102 may store services registry 112 (see FIG. 1), UI registry 114 (see FIG. 1), workflow registry 116 (see FIG. 1) and workflow instance registry 126 (see FIG. 1).

As will be appreciated by one skilled in the art, the present invention may be embodied as a system, method or computer program product. Accordingly, an aspect of an embodiment of the present invention may take the form of an entirely hardware aspect, an entirely software aspect (including firmware, resident software, micro-code, etc.) or an aspect combining software and hardware aspects that may all generally be referred to herein as a "module". Furthermore, an embodiment of the present invention may take the form of a computer program product embodied in one or more computer-readable medium(s) (e.g., memory 1104 and/or computer data storage unit 1112) having computer-readable program code (e.g., program code 1114 and 1116) embodied or stored thereon.

Any combination of one or more computer-readable mediums (e.g., memory 1104 and computer data storage unit 1112) may be utilized. The computer readable medium may be a computer-readable signal medium or a computer-readable storage medium. In one embodiment, the computer-readable storage medium is a computer-readable storage device or computer-readable storage apparatus. A computer-readable storage medium may be, for example, but not limited to, an electronic, magnetic, optical, electromagnetic, infrared or semiconductor system, apparatus, device or any suitable combination of the foregoing. A non-exhaustive list of more specific examples of the computer-readable storage medium includes: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be a tangible medium that can contain or store a program (e.g., program 1114 and 1116) for use by or in connection with a system, apparatus, or device for carrying out instructions.

A computer readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with a system, apparatus, or device for carrying out instructions.

Program code (e.g., program code 1114 and 1116) embodied on a computer-readable medium may be transmitted using any appropriate medium, including but not limited to wireless, wireline, optical fiber cable, RF, etc., or any suitable combination of the foregoing.

Computer program code (e.g., program code 1114 and 1116) for carrying out operations for aspects of the present invention may be written in any combination of one or more programming languages, including an object oriented programming language such as Java®, Smalltalk, C++ or the like and conventional procedural programming languages, such as the "C" programming language or similar programming languages. Instructions of the program code may be carried out entirely on a user's computer, partly on the user's computer, as a stand-alone software package, partly on the user's computer and partly on a remote computer or entirely on the remote computer or server, where the aforementioned user's computer, remote computer and server may be, for example, computer system 102 or another computer system (not shown) having components analogous to the components of computer system 102 included in FIG. 11. In the latter scenario, the remote computer may be connected to the user's computer through any type of network (not shown), including a LAN or a WAN, or the connection may be made to an external computer (e.g., through the Internet using an Internet Service Provider).

Aspects of the present invention are described herein with reference to flowchart illustrations (e.g., FIG. 2 or FIG. 8) and/or block diagrams of methods, apparatus (systems) (e.g., FIG. 1 and FIG. 11), and computer program products according to embodiments of the invention. It will be understood that each block of the flowchart illustrations and/or block diagrams, and combinations of blocks in the flowchart illustrations and/or block diagrams, can be implemented by computer program instructions (e.g., program code 1114 or 1116). These computer program instructions may be provided to one or more hardware processors (e.g., CPU 1102) of a general purpose computer, special purpose computer, or other programmable data processing apparatus to produce a machine, such that the instructions, which are carried out via the processor(s) of the computer or other programmable data processing apparatus, create means for implementing the functions/acts specified in the flowchart and/or block diagram block or blocks.

These computer program instructions may also be stored in a computer-readable medium (e.g., memory 1104 or computer data storage unit 1112) that can direct a computer (e.g., computer system 102), other programmable data processing apparatus, or other devices to function in a particular manner, such that the instructions (e.g., program 1114 and 1116) stored in the computer-readable medium produce an article of manufacture including instructions which implement the function/act specified in the flowchart and/or block diagram block or blocks.

The computer program instructions may also be loaded onto a computer (e.g., computer system 102), other programmable data processing apparatus, or other devices to cause a series of operational steps to be performed on the computer, other programmable apparatus, or other devices to produce a computer implemented process such that the instructions (e.g., program 1114 and 1116) which are carried out on the computer, other programmable apparatus, or other devices provide processes for implementing the functions/acts specified in the flowchart and/or block diagram block or blocks.

Any of the components of an embodiment of the present invention can be deployed, managed, serviced, etc. by a service provider that offers to deploy or integrate computing infrastructure with respect to generating an analytic solution. Thus, an embodiment of the present invention discloses a process for supporting computer infrastructure, wherein the process comprises providing at least one support service for at least one of integrating, hosting, maintaining and deploying computer-readable code (e.g., program code 1114 and 1116) in a computer system (e.g., computer system 102) comprising one or more processors (e.g., CPU 1102), wherein the processor(s) carry out instructions contained in the code causing the computer system to generate an analytic solution.

In another embodiment, the invention provides a method that performs the process steps of the invention on a subscription, advertising and/or fee basis. That is, a service provider, such as a Solution Integrator, can offer to create, maintain, support, etc. a process of generating an analytic solution. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flowcharts in FIG. 2 and FIG. 8 and the block diagrams in FIG. 1 and FIG. 11 illustrate the architecture, functionality, and operation of possible implementations of systems, methods, and computer program products according to various embodiments of the present invention. In this regard, each block in the flowchart or block diagrams may represent a module, segment, or portion of code (e.g., program code 1114 and 1116), which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Example Exploratory Analytic Operations The operations described in this section are examples of the analytic functions that may provide the inputs, analytic steps (e.g., web services), and outputs that may be used in analytic processes generated by embodiments of the present invention.

Keyword Search: Finds all examples that match a string of keywords separated by and/or. Words that are not to be included in the search results may also be entered. A "create class" function creates classes based on a keyword string. A "category comparison" function displays a visualization that compares a selected set of documents to a selected set of categories. The affinity of the document/category combination may be indicated in a table by coloration saturation and hue. A "show results" function shows the results of the keyword search including word frequency and the most statistically significant words.

Generate Synonyms: Generates a new file having synonyms, which are words that are treated as equivalent. This function generates synonyms based on a "stemming" algorithm. Words such as printer and printers will be considered synonyms because they have the same root.

Detect Stock Phrases: In some helpdesk data sets, operators cut and paste canned text (i.e., stock phrases) repeatedly instead of typing in their own words. This function identifies stock phrases so that the stock phrase text can be ignored in a dictionary being generated.

Dictionary Tool: The Dictionary Tool provides the frequency and relevancy of words, and is used to edit a dictionary to either add synonyms or to remove unnecessary words or phrases.

Edit Rule Base: This function allows adding rules to a rule set, deleting rules from the rule set, and editing existing rules in the rule set.

Generate New Classification: Uses a k-means clustering algorithm to automatically generate a classification of a data set based on word similarity among the examples.

Purify Existing Classification: A clustering option that runs a k-means clustering algorithm to completion to generate a new classification by starting from the current classification.

Purify Stepwise: Similar to the Purify Existing Classification function, but executes only one iteration of k-means before halting.

Classify by Keywords: Allows a user to specify her/his own classification scheme by entering keyword queries that define each class in the taxonomy.

Subclass all Classes: Immediately generates subclasses for all classes at the current level.

Subclass from Structured Info: Immediately generates subclasses for all classes at the current level by using a structured input file containing a designated class name for each example.

Delete Classes: Removes one or more classes from the classification. The examples that belong to a class being removed can either be deleted or moved. If not deleted, each example will go to the next closest class.

Add Classes: Adds a specific concept to the taxonomy.

Generate Category: Similar to the Add Classes function, but Generate Category also allows the user to create a category that has no current examples.

Add Examples: Adds additional examples to an existing classification without having to rerun the classification from scratch. Each of the added examples is added to the cluster whose centroid is most similar to the added example's content. The previous examples remain unchanged.

Merge Similar Classes: Automatically merges all classes with similar word content (i.e., merges all classes that are dominated by the same term (e.g., a term occurring with 90% frequency)).

Refine Miscellaneous: Automatically splits up a Miscellaneous class as many times as necessary to get classes that have meaningful names.

Regenerate Dictionary: Generates a new dictionary from frequently occurring words and phrases in the text. The classification remains unchanged by this operation.

Generate Class Names: Generates class names for all selected classes at the current level.

Discover Time Dependency: Show time trends in the unstructured data.

Recent Trends: Similar to the Discover Time Dependency function, but is specialized to look specifically for interesting events occurring in the most recent data items.

Summarize Class: Creates a text summary of the selected class, describing the major components of the class in sentences and phrases selected from the class examples.

Class Occurrence vs. Time: Displays a line graph showing one or more classes and how often they occur over time.

Keyword Occurrence vs. Time: Same as the Category Occurrence vs. Time function, except that frequency of keyword occurrence is depicted instead of class occurrence.

Sort By: Sorts the current set of classes via various methods.

Show Full Text: Shows the entire text of each example in a class view.

Show Colored Text: Shows words in the text that are dictionary terms as colored text, where a first color indicates words that occur frequently in the class, a second color indicates words that do not occur frequently, and a third color indicates words that are not in the dictionary.

Select Metrics: Selects columns of metrics to be displayed in the Class Table view. The selections may include: Cohesion, Distinctness, Keyword Match (i.e., what perentage of each class matches a user supplied keyword string), Volume (i.e., a measure of the dictionary span of a class (how many different words are used in the class examples), Current Classifier (i.e., how accurately the current classifier can classify the examples of each class), Recency (i.e., what percentage of each class has a date stamp that falls within the last 10% of the data (chronologically)), Term (i.e., the dictionary term with the highest percentage occurrence in the class), and all other metrics for particular classifiers, which show the predicted accuracy of the selected classifier on unseen documents.

Dictionary Co-Occurrence: Displays of table of all dictionary terms with indications for each combination of terms describing how often they occur together in the same document, and how unlikely this co-occurrence is.

Show Misclassified: Shows those examples which are not correctly categorized by the classifier.

Remove Current Subclassification: Completely deletes the current subclassification (the one displayed in the Class Table) and all descendant classes.

Rollup: Removes the current subclassification (the one displayed in the Class Table), but retains its classes and puts the classes at the end of the parent classification.

Navigator: When a visualization plot displays too many classes at once, turning the Navigator "on" refreshes the display focusing on just the current class and its near neighbors in space. In this mode, clicking on a centroid causes the plot to shift perspective, making the selected class the current class and changing the visible classes to be the nearest neighbors of the selected class. Turning the Navigator "off" causes all the classes of the current level of the class hierarchy to be displayed.

Tour: Causes the dot plot to rotate continuously from one plane to another.

Select Classes to View: Selects which classes are to be displayed in the visualization plot.

Move Examples: Creates a blow up window within the visualization which can be used to select examples and move them to a different class.

Rotate: Keeps the same primary centroids but rotates them to sit on different axes.

Refresh: Does a screen repaint and is used when some graphics are not properly displayed.

Dot Graph: Indicates that the data is to be viewed as a dot graph (a.k.a. scatter plot).

Density Graph: Indicates the data is to be viewed as a density plot. The coloration of any portion of the graph depends on the number of points that occupy that space.

Contour Graph: Indicates the data is to be viewed as a contour plot. The coloration of any portion of the graph depends on the number of points that occupy that space and the number of points that occupy neighboring spaces.

Show Axes: Hides or displays the axes in the plot.

Show Origin: Hides or displays the origin of the plot (i.e., the point where all dictionary terms are zero).

Show Outliers: Causes the example that is farthest from the class centroid to be circled.

Show RNG Lines: Hides or displays similarity lines between class centroids. RNG stands for Relative Neighborhood Graph. A line is drawn in a Relative Neighborhood Graph if there is no other node closer to either of the two connected nodes. RNG lines help to visualize the relative closeness of concepts.

Filter: Allows the user to decrease the number of data points displayed in the Visualization by randomly removing some percentage of the points from the plot.

Refresh: Repaints the graphics in case they have been messed up.

Rename: Gives the selected class a new name.

Subclass: Subclasses the selected class. Creates five subclasses using the k-means clustering algorithm.

Merge: Merges the selected classes into a new class. The merged classes are deleted and all of their examples go into a new class.

Merge as Subclass: Same as the Merge function, except the old classes are retained as subclasses of the new class.

View/Select: If the selected node is a leaf, then goes to the Class View, displaying the selected node. If the selected node is not a leaf, then goes to the Class Table with the selected classification displayed.

View Selected Examples: Displays the full text of the selected example rows.

Nearest Neighbor: Changes the "Fit" value to be the distance between every example and the selected example. Sorting by "Fit" will now display the examples that are the nearest neighbors to the selected example(s). A "1.0" fit value indicates a perfect match. A "0.0" value indicates the examples share no words in common.

Visualize Examples: Displays a scatter plot with the selected examples circled.

Move Examples: Selects one or more examples to remove from the current class. The selected examples may be deleted completely, or moved to a brand new class, or moved to an existing class. Selected examples may also be copied to another class.

View Secondary Classes: Displays a pie chart indicating where the examples of the class would go if this class were deleted. The slices of the pie can be clicked on to display the actual examples that make up the slice.

No Sort: Shows the examples in the original order in which they appear in the file.

Most Typical: Shows the examples in increasing order of distance from the class centroid.

Least Typical: Shows the examples in decreasing order of distance from the class centroid.

Keyword: Shows first the examples that contain the last keyword search expression.

Solution Authoring Usefulness: Shows first those examples that provide useful diagnostic or corrective actions. These examples are identified by counting typical diagnostic or corrective phrases such as: "tried to" or "told customer".

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of generating an analytic solution, the method comprising the steps of:
displaying in a user interface a plurality of input data sources and a plurality of output types;
receiving, via the user interface, a selection by a user of one of the displayed plurality of input data sources and a selection by the user of one of the displayed plurality of output types;
based in part on the selected output type and the selected input data source, executing a back chain reasoning process based on the selected output type and the selected input data source;
based on the back chain reasoning process, determining (1) a final step of a workflow being a web service or a web-based applet generating output of the selected output type, (2) an initial step of the workflow being a web service or a web-based applet collecting input data from the selected input data source, (3) first multiple web services or web-based applets, each of the first multiple web services or web-based applets being a potential first intermediary step in the workflow between the initial and final steps, and (4) second multiple web services or web-based applets, each of the second multiple web services or web-based applets being a potential second intermediary step in the workflow between the initial and final steps, and the first and second multiple web services or web-based applets based in part on a description of input to the web service or web-based applet generating the output of the selected output type and a description of output of the web service or web-based applet collecting the input data from the selected input data source;
displaying in the user interface the first and second multiple web services or web-based applets;
receiving, via the user interface displaying the first and second multiple web services or web-based applets, a first selection by the user of a first web service or a first web-based applet as a first intermediary step in the workflow, the first web service being selected from the displayed first multiple web services or the first web-based applet being selected from the displayed first multiple web-based applets;
receiving, via the user interface displaying the first and second multiple web services or web-based applets, a second selection by the user of a second web service or a second web-based applet as a second intermediary step in the workflow, the second web service being selected from the displayed second multiple web services or the second web-based applet being selected from the displayed second multiple web-based applets, the second intermediary step being different from the first intermediary step and the second selection being different from the first selection;

executing the workflow that includes the initial step, the first web service or the first web-based applet as the first intermediary step, the second web service or the second web-based applet as the second intermediary step, and the final step;

determining the output generated by the final step of the executed workflow that includes the first web service or the first web-based applet as the first intermediary step and further includes the second web service or the second web-based applet as the second intermediary step does not satisfy a business objective;

in response to the output not satisfying the business objective, receiving, via the user interface displaying the first multiple web services or web-based applets and displaying the second selection of the second web service or the second web-based applet, a third selection by the user of a third web service or a third web-based applet as a replacement of the first selection as the first intermediary step in the workflow, the third web service being selected from the displayed first multiple web services, or the third web-based applet being selected from the displayed first multiple web-based applets, and the third selection being different from the first selection;

updating the workflow to include the initial step, the third web service or the third web-based applet as the first intermediary step, the second web service or the second web-based applet as the second intermediary step, and the final step, the third web service or the third web-based applet being a replacement of the first web service or the first web-based applet as the first intermediary step in the workflow, and the second web service or the second web-based applet being unchanged from the second intermediary step in the workflow executed prior to the step of updating;

executing the updated workflow;

determining the output generated by the final step of the executed updated workflow that includes the third web service or the third web-based applet as the first intermediary step and the second web service or the second web-based applet as the second intermediary step satisfies the business objective; and based on the output generated by the final step of the executed updated workflow satisfying the business objective, determining the updated workflow is the analytic solution;

determining a report generation web service whose output is a report that includes correlations and connections among categories and features of data from the selected input data source, wherein the step of receiving the selection of one of the displayed plurality of output types includes receiving a selection of the report that includes the correlations and the connections among the categories and the features of the data from the selected input data source;

based on the selected input data source being a collection of documents, determining that one or more taxonomies over the collection of documents is an input required by the report generation web service, the one or more taxonomies divide the data into meaningful groups characterized by the categories and the features, wherein the step of receiving the selection of one of the displayed plurality of input data sources includes receiving a selection of the collection of documents;

determining a taxonomy creation web service whose output is the input required by the report generation web service;

determining that relevant content is an input required by the taxonomy creation web service, the relevant content being content that is from a selected subset of the documents and that remains after a systematic removal of irrelevant content from the selected subset of the documents using clustering or rule-based filters;

determining an irrelevant content removal web service whose output is the input required by the taxonomy creation web service;

determining the selected subset of the documents is an input required by the irrelevant content removal web service, the selected subset of the documents being selected from the collection of documents based on a keyword, a structure, and a category of the one or more taxonomies;

determining a document subset selection web service whose output is the input required by the irrelevant content removal web service and whose required input is the collection of documents; and determining an ordered arrangement of web services which is (1) the document subset selection web service, (2) the irrelevant content removal web service, (3) the taxonomy creation web service, and (4) the report generation web service, wherein the step of determining the final step of the workflow includes the step of determining the report generation web service, wherein the step of determining the initial step of the workflow includes determining the document subset selection web service, and wherein the steps of displaying the plurality of input data sources and the plurality of output types, receiving the selection of one of the displayed plurality of input data sources and the selection of one of the displayed plurality of output types, executing the back chain reasoning process, determining the final step, the initial step, the first multiple web services or web-based applets, and the second multiple web services or web-based applets, displaying the first and second multiple web services or web-based applets, receiving the first selection of the first web service or the first web-based applet, receiving the second selection of the second web service or the second web-based applet, executing the workflow, determining the output generated by the final step of the executed workflow does not satisfy the business objective, receiving the third selection of the third web service or the third web-based applet, updating the workflow, executing the updated workflow, determining the output generated by the final step of the executed updated workflow satisfies the business objective, determining the updated workflow is the analytic solution, determining the report generation web service, determining that the one or more taxonomies is the input required by the report generation web service, determining the taxonomy creation web service, determining that the relevant content is the input required by the taxonomy creation web service, determining the irrelevant content removal web service, determining the selected subset of the documents is the input required by the irrelevant content removal web service, determining the document subset selection web service, and determining the ordered arrangement of the web services are performed by at least one computer.

2. The method of claim 1, comprising the steps of:

generating a set of multiple combinations of web services and web-based applets; and pruning the set of multiple combinations to retain a subset of the multiple combinations that includes workflows that generate the selected output type.

3. The method of claim 1, wherein the step of displaying the plurality of output types includes displaying, in the user interface, output types consisting of a trend chart and a contingency table.

4. The method of claim 1, wherein the step of displaying the plurality of output types includes displaying, in the user interface, output types including a scatter plot, a pie chart, a density plot, a contour plot, and a line graph.

5. The method of claim 1, wherein the step of displaying the plurality of input data sources includes displaying a collection of patents as an input data source included the plurality of input data sources, and wherein the step of receiving the selection of one of the displayed plurality of input data sources includes receiving a selection of the collection of patents.

6. A process for supporting computing infrastructure, the process comprising:

providing at least one support service for at least one of creating, integrating, hosting, maintaining, and deploying computer-readable code in a computer comprising a central processing unit (CPU), wherein the CPU carries out instructions contained in the code causing the computer to perform a method of generating an analytic solution, the method comprising the steps of:

displaying in a user interface a plurality of input data sources and a plurality of output types;

receiving, via the user interface, a selection by a user of one of the displayed plurality of input data sources and a selection by the user of one of the displayed plurality of output types;

based in part on the selected output type and the selected input data source, executing a back chain reasoning process based on the selected output type and the selected input data source;

based on the back chain reasoning process, determining (1) a final step of a workflow being a web service or a web-based applet generating output of the selected output type, (2) an initial step of the workflow being a web service or a web-based applet collecting input data from the selected input data source, (3) first multiple web services or web-based applets, each of the first multiple web services or web-based applets being a potential first intermediary step in the workflow between the initial and final steps, and (4) second multiple web services or web-based applets, each of the second multiple web services or web-based applets being a potential second intermediary step in the workflow between the initial and final steps, and the first and second multiple web services or web-based applets based in part on a description of input to the web service or web-based applet generating the output of the selected output type and a description of output of the web service or web-based applet collecting the input data from the selected input data source;

displaying in the user interface the first and second multiple web services or web-based applets;

receiving, via the user interface displaying the first and second multiple web services or web-based applets, a first selection by the user of a first web service or a first web-based applet as a first intermediary step in the workflow, the first web service being selected from the displayed first multiple web services or the first web-based applet being selected from the displayed first multiple web-based applets;

receiving, via the user interface displaying the first and second multiple web services or web-based applets, a second selection by the user of a second web service or a second web-based applet as a second intermediary step in the workflow, the second web service being selected from the displayed second multiple web services, or the second web-based applet being selected from the displayed second multiple web-based applets, the second intermediary step being different from the first intermediary step and the second selection being different from the first selection;

executing the workflow that includes the initial step, the first web service or the first web-based applet as the first intermediary step, the second web service or the second web-based applet as the second intermediary step, and the final step;

determining the output generated by the final step of the executed workflow that includes the first web service or the first web-based applet as the first intermediary step and further includes the second web service or the second web-based applet as the second intermediary step does not satisfy a business objective; in response to the output not satisfying the business objective, receiving, via the user interface displaying the first multiple web services or web-based applets and displaying the second selection of the second web service or the second web-based applet, a third selection by the user of a third web service or a third web-based applet as a replacement of the first selection as the first intermediary step in the workflow, the third web service being selected from the displayed first multiple web services, or the third web-based applet being selected from the displayed first multiple web-based applets, and the third selection being different from the first selection;

updating the workflow to include the initial step, the third web service or the third web-based applet as the first intermediary step, the second web service or the second web-based applet as the second intermediary step, and the final step, the third web service or the third web-based applet being a replacement of the first web service or the first web-based applet as the first intermediary step in the workflow, and the second web service or the second web-based applet being unchanged from the second intermediary step in the workflow executed prior to the step of updating;

executing the updated workflow;

determining the output generated by the final step of the executed updated workflow that includes the third web service or the third web-based applet as the first intermediary step and the second web service or the second web-based applet as the second intermediary step satisfies the business objective; and based on the output generated by the final step of the executed updated workflow satisfying the business objective, determining the updated workflow is the analytic solution;

determining a report generation web service whose output is a report that includes correlations and connections among categories and features of data from the selected input data source, wherein the step of receiving the selection of one of the displayed plurality of output types includes receiving a selection of the report that includes the correlations and the connections among the categories and the features of the data from the selected input data source;

based on the selected input data source being a collection of documents, determining that one or more taxonomies over the collection of documents is an input required by the report generation web service, the one or more taxonomies divide the data into meaningful groups characterized by the categories and the features, wherein the step of receiving the selection of one of the displayed plurality of input data sources includes receiving a selection of the collection of documents;

determining a taxonomy creation web service whose output is the input required by the report generation web service;

determining that relevant content is an input required by the taxonomy creation web service, the relevant content being content that is from a selected subset of the documents and that remains after a systematic removal of irrelevant content from the selected subset of the documents using clustering or rule-based filters;

determining an irrelevant content removal web service whose output is the input required by the taxonomy creation web service;

determining the selected subset of the documents is an input required by the irrelevant content removal web service, the selected subset of the documents being selected from the collection of documents based on a keyword, a structure, and a category of the one or more taxonomies;

determining a document subset selection web service whose output is the input required by the irrelevant content removal web service and whose required input is the collection of documents; and determining an ordered arrangement of web services which is (1) the document subset selection web service, (2) the irrelevant content removal web service, (3) the taxonomy creation web service, and (4) the report generation web service, wherein the step of determining the final step of the workflow includes the step of determining the report generation web service, and wherein the step of determining the initial step of the workflow includes determining the document subset selection web service.

7. The process of claim 6, wherein the method comprises the steps of:

generating a set of multiple combinations of web services and web-based applets; and pruning the set of multiple combinations to retain a subset of the multiple combinations that includes workflows that generate the selected output type.

8. The process of claim 6, wherein the step of displaying the plurality of output types includes displaying, in the user interface, output types consisting of a trend chart and a contingency table.

9. The process of claim 6, wherein the step of displaying the plurality of output types includes displaying, in the user interface, output types including a scatter plot, a pie chart, a density plot, a contour plot, and a line graph.

10. The process of claim 6, wherein the step of displaying the plurality of input data sources includes displaying a collection of patents as an input data source included the plurality of input data sources, and wherein the step of receiving the selection of one of the displayed plurality of input data sources includes receiving a selection of the collection of patents.

* * * * *